(12) United States Patent
Sonobe

(10) Patent No.: US 9,413,675 B2
(45) Date of Patent: Aug. 9, 2016

(54) DATA TRANSMISSION APPARATUS, DATA DIVISION APPARATUS AND DATA DIVISION METHOD

(71) Applicant: NEC Corporation, Tokyo (JP)

(72) Inventor: Satoshi Sonobe, Tokyo (JP)

(73) Assignee: NEC Corporation, Tokyo (JP)

( * ) Notice: Subject to any disclaimer, the term of this patent is extended or adjusted under 35 U.S.C. 154(b) by 18 days.

(21) Appl. No.: 14/416,391

(22) PCT Filed: Jul. 5, 2013

(86) PCT No.: PCT/JP2013/004191
§ 371 (c)(1),
(2) Date: Jan. 22, 2015

(87) PCT Pub. No.: WO2014/017036
PCT Pub. Date: Jan. 30, 2014

(65) Prior Publication Data
US 2015/0188834 A1   Jul. 2, 2015

(30) Foreign Application Priority Data

Jul. 25, 2012 (JP) ................................ 2012-164736

(51) Int. Cl.
*H04L 1/00* (2006.01)
*H04L 12/805* (2013.01)
(Continued)

(52) U.S. Cl.
CPC .............. *H04L 47/365* (2013.01); *H04L 29/02* (2013.01); *H04L 29/08* (2013.01); *H04L 69/02* (2013.01); *H04L 69/166* (2013.01)

(58) Field of Classification Search
CPC ................. H04J 3/16; H04J 3/17; H04J 3/18; H04J 3/19; H04J 29/06163; H04J 29/06164; H04J 3/1682; H04J 29/0653; H04J 29/0654

USPC .......................... 370/474, 473, 464, 465, 468
See application file for complete search history.

(56) References Cited

U.S. PATENT DOCUMENTS 7,835,452 B2 * 11/2010 Park ..................... H04N 19/105
                                                             375/240.25
8,270,490 B2 * 9/2012 Sakamoto ............ H04N 19/176
                                                             375/240.01

(Continued)

FOREIGN PATENT DOCUMENTS

JP        2002-84312        3/2002
JP        2012-49835        3/2012

OTHER PUBLICATIONS

International Search Report and Written Opinion mailed Sep. 3, 2013 in corresponding PCT International Application.

(Continued)

*Primary Examiner* — Dady Chery
(74) *Attorney, Agent, or Firm* — Finnegan, Henderson, Farabow, Garrett & Dunner LLP

(57) ABSTRACT

A data transmission apparatus includes: a transmission data division unit which divides transmission data into blocks; a transmission unit which transmits the blocks divided by the transmission data division unit to the transmission destination apparatus; a calculation unit which calculates a size of residual data generated by dividing the transmission data into the blocks each having the predetermined data size; and a residual data judgment unit which judges whether the size of the residual data calculated by the calculation unit is smaller or not smaller than a minimum data size which the receiving apparatus can receive. In the case that it is judged that the size of the residual data is smaller than the minimum data size, the transmission data division unit generates a block, which includes the residual data and whose data size is equal to or larger than the minimum data size, by dividing the transmission data so as to make the block, which includes the residual data, include a part of the transmission data other than the residual data.

11 Claims, 13 Drawing Sheets

(51) Int. Cl.
*H04L 29/06* (2006.01)
*H04L 29/02* (2006.01)
*H04L 29/08* (2006.01)

(56) References Cited

U.S. PATENT DOCUMENTS 8,306,115 B2 * 11/2012 Han ................... H04N 19/105 348/403.1
8,929,449 B2 * 1/2015 Sakamoto ............. H04N 19/61 375/240.16
2006/0159168 A1 * 7/2006 Ahn ..................... H04N 19/61 375/240.03
2008/0192924 A1 8/2008 Shang
2010/0277602 A1 * 11/2010 Asano ................ H04N 5/23248 348/208.4

OTHER PUBLICATIONS

Extended European Search Report mailed Mar. 2, 2016, by the European Patent Office in counterpart European Patent Application No. 13822530.5.

* cited by examiner

IN THE CASE THAT X = M x n

IN THE CASE THAT X ≠ M x n AND x ≧ m

IN THE CASE THAT X ≠ M x n AND x < m

IN THE CASE THAT X = 1279byte

M = 256byte
m = 64byte
x = 255byte

IN THE CASE THAT X = 1281byte

M = 256byte
m = 64byte
x = 1byte
x1 = 128byte
x2 = 129byte

IN THE CASE THAT x = M x n

IN THE CASE THAT x ≠ M x n

DATA TRANSMISSION APPARATUS, DATA DIVISION APPARATUS AND DATA DIVISION METHOD

CROSS-REFERENCE TO RELATED PATENT APPLICATIONS

This application is a National Stage Entry of International Application No. PCT/JP2013/004191, filed Jul. 5, 2013, which claims priority from Japanese Patent Application No. 2012-164736, filed Jul. 5, 2012. The entire contents of the above-referenced applications are expressly incorporated herein by reference.

TECHNICAL FIELD

The present invention is related to a data transmission apparatus, a data division apparatus and a data division method, and particularly are related to a data transmission apparatus, a data division apparatus and a data division method which divide transmission data into blocks.

BACKGROUND ART

In the case of packet transmission, a packet transmission apparatus divides packet data, which are received from its preceding communication apparatus, into a plurality of blocks each having a fixed block size (predetermined block size), and assigns the blocks to a plurality of transmission lines. Accordingly, the packet transmission apparatus can increase transmission capacity by use of the plural transmission lines.

In the case that a size of the packet data, which are received from the communication apparatus, is not an integral multiple of the fixed data block size, if dividing the packet data into the blocks each having the fixed block size, n (n is any integer) blocks each having the fixed block size, and one block including residual data, whose size is smaller than the fixed block size, are generated.

In the case of a method according to a related art, by carrying out a padding process in which dummy data are added to the residual data, the packet transmission apparatus makes the size of the residual data adjusted to the fixed block size. Then, the packet transmission apparatus transfers data for which the padding process is carried out. The method has a problem that data transmission efficiency is lowered, since the transferred data includes a block which has an area unused for data transmission.

In order to solve the problem, PTL 1 discloses an art to set a size of packet data, which are sent by a communication apparatus, to be equal to or smaller than MTU (Maximum Transfer Unit) defined between the communication apparatus and a transmission destination apparatus, and to be an integral multiple of a block size which is applied to a low rank transmission line. By using the method, it is avoided to generate the residual data in the division process carried out by the packet transmission apparatus which receives the packet data from the communication apparatus. Therefore, it is possible to avoid generation of the block which includes the unused area.

CITATION LIST

Patent Literature

PTL 1: Japanese Patent Application Laid-Open Publication No. 2002-084312

Technical Problem

According to the art disclosed in PTL 1, it is assumed that the communication apparatus adjusts the size of the data packet, and according to the art, a situation that the communication apparatus sends packet data, which has an optional size, to the packet transmission apparatus is not taken into consideration. Accordingly, in the case that the communication apparatus sends the packet data, which has the optional size, to the packet transmission apparatus, the residual data is generated in the division process which is carried out by the packet transmission apparatus. Therefore, it is not possible to restrain generation of the block including the unused area, and consequently the problem that packet transmission efficiency is lowered still remains.

The present invention is conceived to solve the problem. An object of the present invention is to provide a data transmission apparatus, a data division apparatus and a data division method which can make data transmission efficient.

Solution To Problem

A first aspect of the present invention includes a data transmission apparatus which divides transmission data into blocks each of which has a predetermined data size, and transmits the blocks to a transmission destination apparatus. The data transmission apparatus includes: a transmission data division unit which divides the transmission data into the blocks; a transmission unit which transmits the blocks divided by the transmission data division unit to the transmission destination apparatus: a calculation unit which calculates a size of residual data generated by dividing the transmission data into the blocks each having the predetermined data size; and a residual data judgment unit which judges whether the size of the residual data calculated by the calculation unit is smaller or not smaller than a minimum data size which the transmission destination apparatus can receive. In the case that the residual data judgment unit judges that the size of the residual data is smaller than the minimum data size, the transmission data division unit generates a block, which includes the residual data and whose data size is equal to or larger than the minimum data size, by dividing the transmission data so as to make the block, which includes the residual data, include a part of the transmission data other than the residual data.

A second aspect of the present invention includes a data division apparatus which divides transmission data into blocks each of which has a predetermined data size. The data division apparatus includes: a transmission data division unit which divides the transmission data into the blocks; a calculation unit which calculates a size of residual data generated by dividing the transmission data into the blocks each having the predetermined data size; and a residual data judgment unit which judges whether the size of residual data calculated by the calculation unit is smaller or not smaller than a minimum data size which a transmission destination apparatus can receive. In the case that the residual data judgment unit judges that the size of the residual data is smaller than the minimum data size, the transmission data division unit generates a block, which includes the residual data and whose data size is equal to or larger than the minimum data size, by dividing the transmission data so as to make the block, which includes the residual data, include a part of the transmission data other than the residual data.

A third aspect of the present invention includes a data division method used by a data division apparatus which divides transmission data into blocks each of which has a predetermined data size. The data division method includes the following steps (a), (b) and (c):

(a) calculating a size of residual data generated by dividing the transmission data into the blocks each of which has the predetermined data size;

(b) judging whether the calculated size of the residual data is smaller or not smaller than a minimum data size which a transmission destination apparatus can receive; and (c) generating a block, which includes the residual data and whose data size is equal to or larger than the minimum data size, by dividing the transmission data so as to make the block, which includes the residual data, include a part of the transmission data other than the residual data, in the case that it is judged that the size of the residual data is smaller than the minimum data size.

Advantageous Effects Of Invention

According to each aspect of the present invention, it is possible to provide the data transmission apparatus, the data division apparatus and the data division method which can realize efficient data transmission.

DESCRIPTION OF EMBODIMENTS

Exemplary Embodiment 1

Hereinafter, an exemplary embodiment according to the present invention will be explained with reference to drawings.

Figure 1:
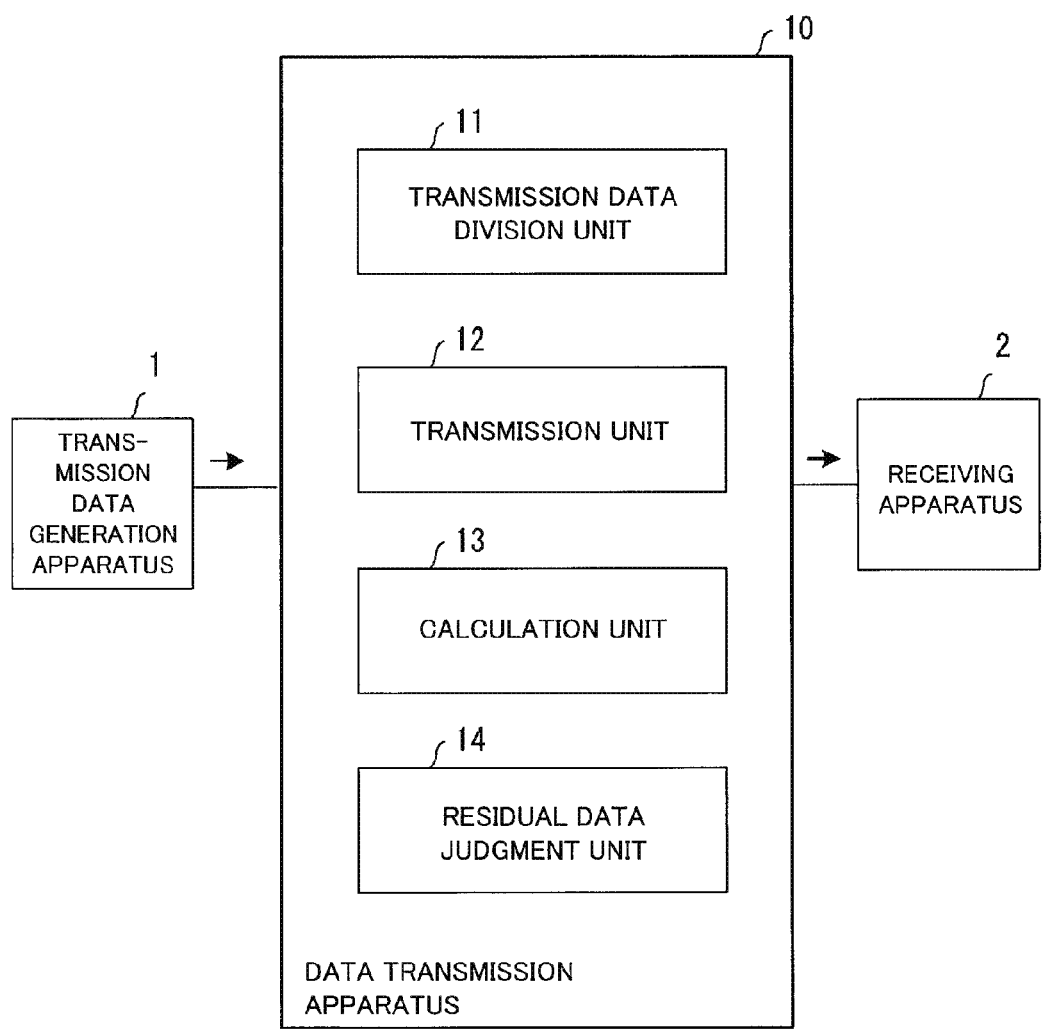
FIG. 1 is a block diagram showing a configuration example of a data transmission apparatus according to an exemplary embodiment 1.

FIG. 1 is a block diagram showing a configuration example of a data transmission apparatus according to an exemplary embodiment 1. A data transmission apparatus 10 is a data transmission apparatus which divides transmission data, which a transmission data generation apparatus 1 generates, into blocks (block data) each having a predetermined data size, and transmits the blocks to a receiving apparatus 2 (transmission destination apparatus). The data transmission apparatus 10 and the receiving apparatus 2 are connected each other via a wired or wireless transmission line. The data transmission apparatus 10 includes a transmission data division unit 11, a transmission unit 12, a calculation unit 13 and a residual data judgment unit 14.

The transmission data division unit 11 divides the transmission data, which are generated by the transmission data generation apparatus 1, into the blocks. Details of a division process, which is carried out by the transmission data division unit 11, will be described later.

The transmission unit 12 transmits transmission data divided by the transmission data division unit 11 into blocks, to the receiving apparatus 2.

The calculation unit 13 calculates a size of residual data generated by dividing the transmission data, which are generated by the transmission data generation apparatus 1, into the blocks each having the predetermined data size. Here, the predetermined data size is a data size which is set by a user. For example, the data size is a value depending on a state of the transmission line between the data transmission apparatus 10 and the receiving apparatus 2. As one example of the predetermined data size, a value of the data size is set to such a degree that transmission delay is not caused on the transmission line.

The residual data judgment unit 14 judges whether the size of the residual data, which is calculated by the calculation unit 133, is smaller or not smaller than a minimum data size which the receiving apparatus 2 can receive. Each unit of the data transmission apparatus 10 mentioned above is realized by hardware such as IC (Integrated Circuit) or the like, software such as application software or the like or the hardware and the software.

The transmission data generation apparatus 1 is an apparatus which generates the transmission data and sends the transmission data to the data transmission apparatus 10.

The receiving apparatus 2 receives the transmission data divided into blocks, from the data transmission apparatus 10. Here, the receiving apparatus 2 does not receive data, whose size is smaller than the minimum data size, as effective receiving data. Accordingly, in order to transmit the transmission data effectively, it is necessary for the data transmission apparatus 10 to transmit a block whose size is equal to or larger than the minimum data size. The minimum data size is a value which is set by a user and is smaller than the predetermined data size mentioned above.

Figure 2:
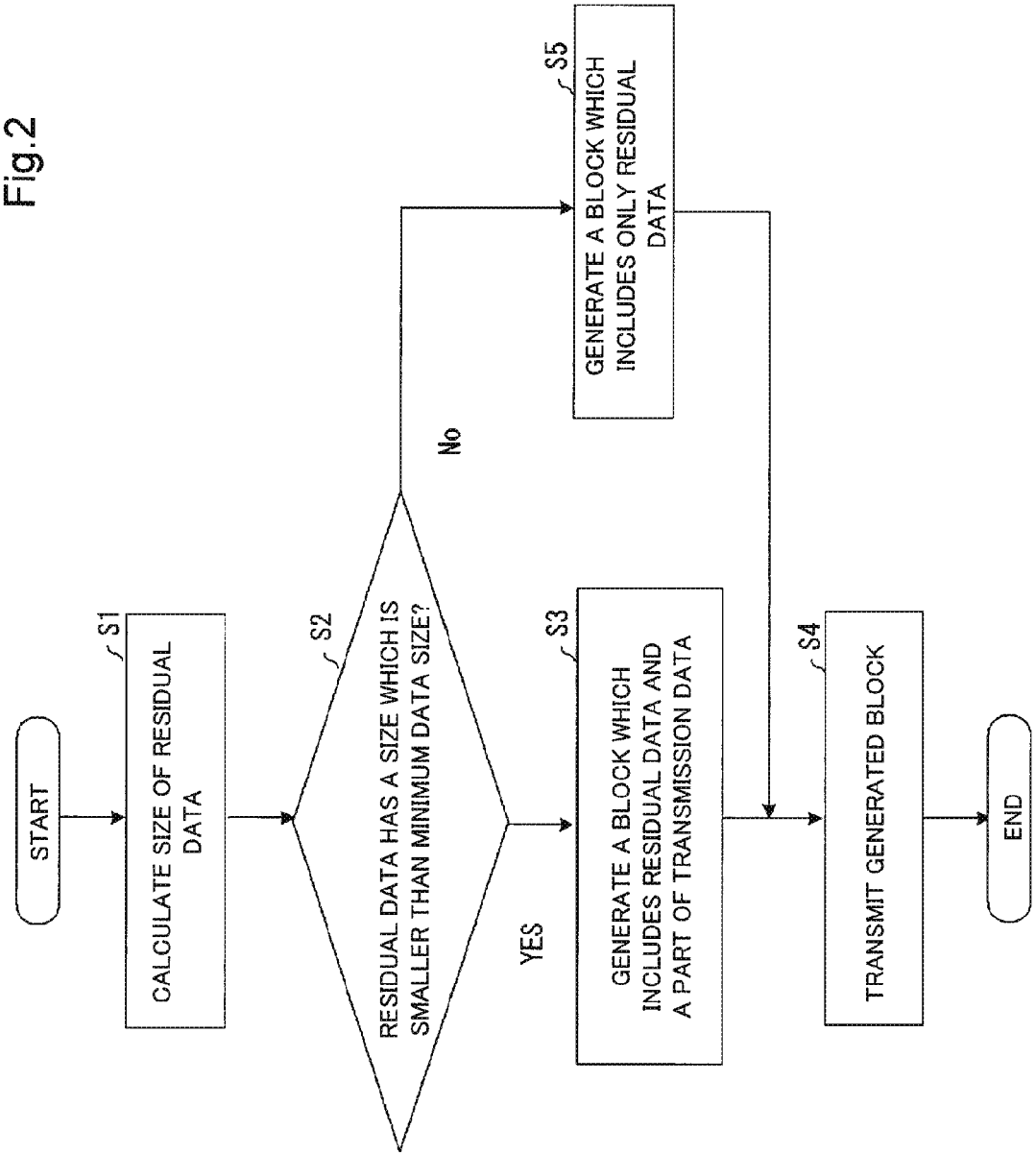
FIG. 2 is a flowchart showing an example of a process which is carried out by the data transmission apparatus according to the exemplary embodiment 1.

Details of the division process which the transmission data division unit 11 carries out will be explained in the following with reference to FIG. 2. FIG. 2 is a flowchart showing an example of a process which is carried out by each unit of the data transmission apparatus 10.

Firstly, the calculation unit 13 calculates the size of the residual data generated by dividing the transmission data, which are outputted by the transmission data generation apparatus 1, into the blocks each having the predetermined data size (Step S1).

Next, the residual data judgment unit 14 judges whether the size of the residual data calculated by the calculation unit 13 is smaller or not smaller than the minimum data size which the receiving apparatus 2 can receive (Step S2).

In the case that the residual data judgment unit 14 judges that the size of the residual data is smaller than the minimum data size (Yes in Step S2), the transmission data division unit 11 divides the transmission data so as to make a block, which includes the residual data, include a part of the transmission data other than the residual data. As a result, the residual data judgment 14 generates a block which includes the residual data and whose data size is equal to or larger than the minimum data size (Step S3).

At this point of time, the transmission data division unit 11 carries out the data division so that a block other than the block, which includes the residual data, may have a size equal to or larger than the minimum data size.

The transmission unit 12 transmits the transmission data divided by the transmission data division unit 11 into blocks, to the receiving apparatus 2 (Step S4). Since each of the blocks generated by the transmission data division unit 11 has a size equal to or larger than the minimum data size, the receiving apparatus 2 can receive all of the blocks with no error.

In Step S2, in the case that the residual data judgment unit 14 judges that the size of the residual data is larger than the minimum data size (No in Step S2), the transmission data division unit 11 divides the transmission data as follows. The transmission data division unit 11 divides the transmission data into a block which includes the residual data and no other data (in FIG. 2, described as 'include only residual data'), and one or more blocks each having a size which is equal to or smaller than the predetermined data size and is equal to or larger than the minimum data size (Step S5).

The transmission unit 12 transmits the transmission data divided by the transmission data division unit 11 into blocks, to the receiving apparatus 2 (Step S4). The block, which is generated in Step S5 and includes the residual data, has a size equal to or larger than the minimum data size. Accordingly, since each of the blocks generated by the transmission data division unit 11 has a size equal to or larger than the minimum data size, the receiving apparatus 2 can receive all of the blocks with no error.

By carrying out the above-mentioned process, even in the case that the size of the residual data is smaller than the minimum data size, the data transmission apparatus 10 can transmit the transmission data by dividing the transmission data into blocks each of whose sizes is equal to or larger than the minimum data size. In other words, even if the size of the transmission data has any value, the data transmission apparatus 10 can transmit the transmission data by diving the transmission data into the blocks each of which has a size equal to or larger than the minimum data size. Therefore, the transmission data division unit 11 can avoid carrying out a process of transmitting a block to which excessive data (unused area) other than the transmission data are added. Accordingly, it is possible to realize efficient data transmission.

Here, the data transmission apparatus 10 may add identification information, such as a header or the like, to the post-division block. In this case, the receiving apparatus 2 restores the transmission data from the received blocks on the basis of the identification information.

The transmission data generation apparatus 1 and the data transmission apparatus 10 may be constituted so as to be united into one apparatus.

Furthermore, the data transmission apparatus 10 may have a configuration that the transmission unit 12 is arranged externally. In this case, the data transmission apparatus 10 works as a data division apparatus which divides the transmission data into blocks.

The invention which has been described in the above can be regarded as an invention on a data division method for dividing the transmission data. The data division method includes the following steps (a), (b) and (c):

(a) calculating a size of residual data generated by dividing the transmission data into blocks each of which has the predetermined data size;

(b) judging whether the calculated size of the residual data is smaller or not smaller than a minimum data size which a transmission destination apparatus can receive; and (c) generating a block, which includes the residual data and whose data size is equal to or larger than the minimum data size, by dividing the transmission data so as to make the block, which includes the residual data, include a part of the transmission data other than the residual data, in the case that it is judged that the size of the residual data is smaller than the minimum data size.

A chip which carries out the method may be mounted on the transmission data apparatus 10.

Exemplary Embodiment 2

Hereinafter, an exemplary embodiment 2 of the present invention will be explained with reference to drawings. Here, a part which has already been explained in the exemplary embodiment 1 is properly omitted.

Figure 3:
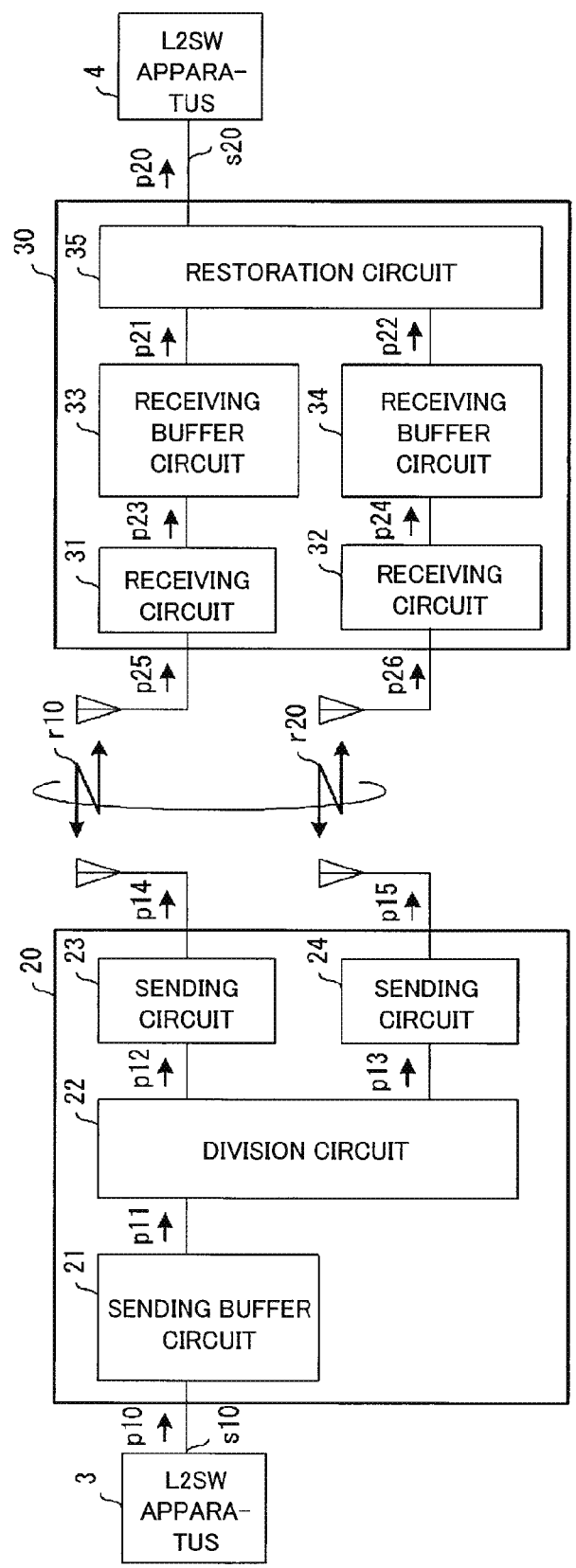
FIG. 3 is a block diagram showing an example of a wireless communication system according to an exemplary embodiment 2.

FIG. 3 shows one example of a wireless communication system which includes L2SW (Layer 2 switch) apparatuses 3 and 4, and wireless packet transmission apparatuses 20 and 30. In FIG. 3, the L2SW apparatus 3 and the wireless packet transmission apparatus 20 are connected each other via a LAN circuit s10, and the L2SW apparatus 4 and the wireless packet transmission apparatus 30 are connected each other via a LAN circuit s20.

The L2SW apparatus 3 is a communication apparatus followed by the wireless packet transmission apparatus 20, and outputs packet data, which are corresponding to the transmission data, to the wireless packet transmission apparatus 20 via the LAN circuit s10. The L2SW apparatus 4 is a communication apparatus preceded by the wireless packet transmission apparatus 30, and obtains packet data, which are corresponding to the transmission data, from the wireless packet transmission apparatus 30 via the LAN circuit s20. The L2SW apparatus 3 is an apparatus opposite to the wireless packet transmission apparatus, and the L2SW apparatus 4 is an apparatus opposite to the wireless packet transmission apparatus 30.

Here, transmission capacity of the LAN circuit s10 is larger than transmission capacity of a wireless circuit r10, and is larger than transmission capacity of a wireless circuit r20. However, a total of the transmission capacity of the wireless circuit r10 and the transmission capacity of the wireless circuit r20 is larger than the transmission capacity of the LAN circuit s10. Moreover, transmission capacity of the LAN circuit s20 is larger than the transmission capacity of the wireless circuit r10, and is larger than the transmission capacity of the wireless circuit r20. However, a total of the transmission capacity of the wireless circuit r10 and the transmission capacity of the wireless circuit r20 is larger than the transmission capacity of the LAN circuit s10. The wireless communication system shown in FIG. 3 transfers the packet data by use of both of the wireless circuit r10 and the wireless circuit r20 (by binding the wireless circuit r10 and the wireless circuit r20). As mentioned above, the wireless packet transmission apparatus 20 intends to increase the transmission capacity by use of a plurality of circuits.

The wireless packet transmission apparatus 20 and the wireless packet transmission apparatus 30 are connected each other via the wireless circuit r10 and the wireless circuit r20. The wireless packet transmission apparatus 20 transfers the packet data to the wireless packet transmission apparatus 30 via the wireless circuits r10 and r20 by use of radio waves. That is, the wireless packet transmission apparatus 20 and the wireless packet transmission apparatus 30 are opposite each other via the wireless circuits.

The wireless packet transmission apparatus 20 is a transmission apparatus which is corresponding to the data transmission apparatus 10 shown in FIG. 1. It is illustrated that the wireless packet transmission apparatus 20 includes a transmission packet data buffer circuit (transmission buffer circuit) 21, a packet data division circuit (division circuit) 22, and a wireless sending circuits (sending circuits) 23 and 24. It is illustrated that the wireless packet transmission apparatus 30 is a receiving apparatus which is corresponding to the receiving apparatus 2 shown in FIG. 1. FIG. 3 shows that the wireless packet transmission apparatus 30 includes wireless receiving circuits (received circuits) 31 and 32, received block data buffer circuits (receiving buffer circuits) 33 and 34, and a packet data restoration circuit 35. Here, the wireless packet transmission apparatus 30 is set so as not to receive a block which has a size smaller than a minimum block size (minimum data size). Hereinafter, each unit of the wireless packet transmission apparatuses 20 and 30 will be explained.

The transmission packet data buffer circuit 21 carries out a buffering process to a transmission packet signal p10 which the L2SW apparatus 3 outputs, and outputs the buffered transmission packet signal p10 to the packet data division circuit 22 as a packet data signal (transmission packet data signal p11). The transmission packet data buffer circuit 21 detects a size of the packet data which the L2SW apparatus 3 outputs in the buffering process.

The packet data division circuit 22 divides the packet data, which the transmission packet data buffer circuit 21 outputs, into a plurality of blocks. Then, the packet data division circuit 22 outputs a part of the generated plural blocks to the wireless sending circuit 23 as a transmission division block signal p12, and outputs the left blocks to the wireless sending circuit 24 as a transmission division block signal p13.

Figure 4:
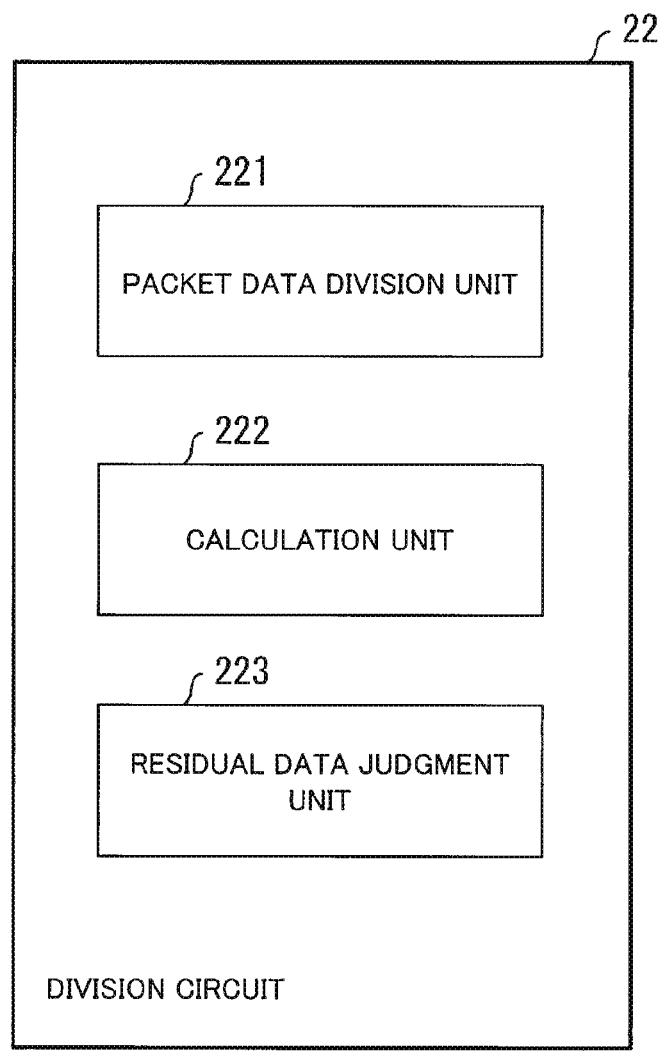
FIG. 4 is a block diagram showing a configuration example of a packet data division circuit according to the exemplary embodiment 2.

FIG. 4 is a block diagram showing a configuration example of the packet data division circuit 22. The packet data division circuit 22 includes a packet data division unit 221, a calculation unit 222 and a residual data judgment unit 223. The packet data division unit 221, the calculation unit 222 and the residual data judgment unit 223 are corresponding to the transmission data division unit 11, the calculation unit 13 and the residual data judgment unit 14 shown in FIG. 1, respectively. Details of the packet data division process, which the packet data division circuit 22 carries out, will be described later.

Here, the packet data division circuit 22 includes a memory (not shown in the drawings) which stores a fixed block size and the minimum block size which are set by a user, and the size of the packet data, inputted to the transmission packet data buffer circuit 21. The fixed block size is corresponding to the predetermined data size which is described in the exemplary embodiment 1. The packet data division circuit 22 reads data, which is stored in the memory, according to a process carried out by each unit, and uses the data.

The packet data division circuit 22 assigns information on a head, an end and a sequence number of the block to each of the plural blocks, into which the packet data division unit 221 divides the packet data, as a header. By the above, it is possible for the packet data division circuit 22 to make the packet data restoration circuit 35, which is included in the receiving side wireless packet transmission apparatus 30, restore the packet data.

The wireless sending circuit 23 multiplexes the block, which the packet data division circuit 22 outputs, into a wireless frame, and carries out a wireless sending process such as a modulation process, DA (Digital to Analog) conversion, frequency conversion and the like. Then, the wireless sending circuit 23 sends data, which are generated by the wireless sending process, to the wireless packet transmission apparatus 30 via the wireless circuit r10 as a transmission wireless signal p14. Similarly, the wireless sending circuit 24 carries out a process such as the wireless transmission process or the like to the block which the packet data division circuit 22 outputs. Then, the wireless sending circuit 24 sends data, which are generated by the wireless transmission process, to the wireless packet transmission apparatus 30 via the wireless circuit r20 as a transmission wireless signal p15. The wireless sending circuits 23 and 24 are corresponding to the transmission unit 12 shown in FIG. 1.

The wireless receiving circuit 31 carries out a wireless receiving process such as frequency conversion, AD (Analog to Digital) conversion, a demodulation process and the like to a received wireless signal p25 (identical to sending wireless signal p14), which the wireless receiving circuit 31 receives via the wireless circuit r10, and consequently extracts the block from the wireless frame. The wireless receiving circuit 31 outputs the extracted block to the received block data buffer circuit 33 as a received wireless block signal p23. Similarly, the wireless receiving circuit 32 carries out the wireless receiving process to a received wireless signal p26 (identical to transmission wireless signal p15), which the wireless receiving circuit 32 receives via the wireless circuit r20, and consequently extracts the block from the wireless frame. Then, the wireless receiving circuit 32 outputs the extracted block to the received block data buffer circuit 34 as a received wireless block signal p24.

The receiving block data buffer circuit 33 carries out a buffering process to the block which is received from the wireless receiving circuit 31, and afterward outputs the buffered block to the packet data restoration circuit 35 as a received division block signal p21. Similarly, the received block data buffer circuit 34 carries out a buffering process to the block which is received from the wireless receiving circuit 32, and afterward outputs the buffered block to the packet data restoration circuit 35 as a received division block signal p22.

The packet data restoration circuit 35 restores the packet data, which the received block data buffer circuit 33 and the received block data buffer circuit 34 output, to the original packet data which the wireless packet transmission apparatus 20 obtains from the L2SW apparatus 3.

Specifically, the packet data restoration circuit 35 refers to the header which the packet data division circuit 22 of the wireless packet transmission apparatus 20 assigns to the packet data. The packet data restoration circuit 35 judges a head position and an end position of the post-division block out of the data on the basis of the referred header. As mentioned above, the packet data restoration circuit 35 detects the post-division block.

Furthermore, by referring to the sequence number which is embedded in the header, the packet data restoration circuit 35 judges whether loss or disappearance of block is caused due to a fault of the wireless circuit or the like or not. In the case that loss of sequence number (state that discontinuity of sequence number is caused) is not caused, the packet data restoration circuit 35 restores the blocks to the original packet data by aligning the blocks in an order of the continuous sequence number.

In the case that loss of sequence number is caused, the packet data restoration circuit 35 discards a block which is being received, and packet data which are in a restoration process. The packet data restoration circuit 35 resumes the packet data restoration process from a top block which is received next.

The packet data restoration circuit 35 outputs the packet data, which are re-generated by the restoration process, to the L2SW apparatus 4 as a received packet signal p20.

Here, for making explanation simplified, FIG. 3 shows only a packet data sending side circuit (transmission packet data buffer circuit 21, packet data division circuit 22 and wireless sending circuits 23 and 24) in the wireless packet transmission apparatus 20. Similarly, FIG. 3 shows only a packet data receiving side circuit (wireless receiving circuits 31 and 32, receiving block data buffer circuits 33 and 34 and packet data restoration circuit 35) in the wireless packet transmission apparatus 30. Actually, the wireless packet transmission apparatus 20 and the wireless packet transmission apparatus 30 have the same configuration. That is, the wireless packet transmission apparatus 20 includes the packet data received side circuit not shown, and the wireless packet transmission apparatus 30 includes the packet data sending side circuit not shown.

Figure 5:
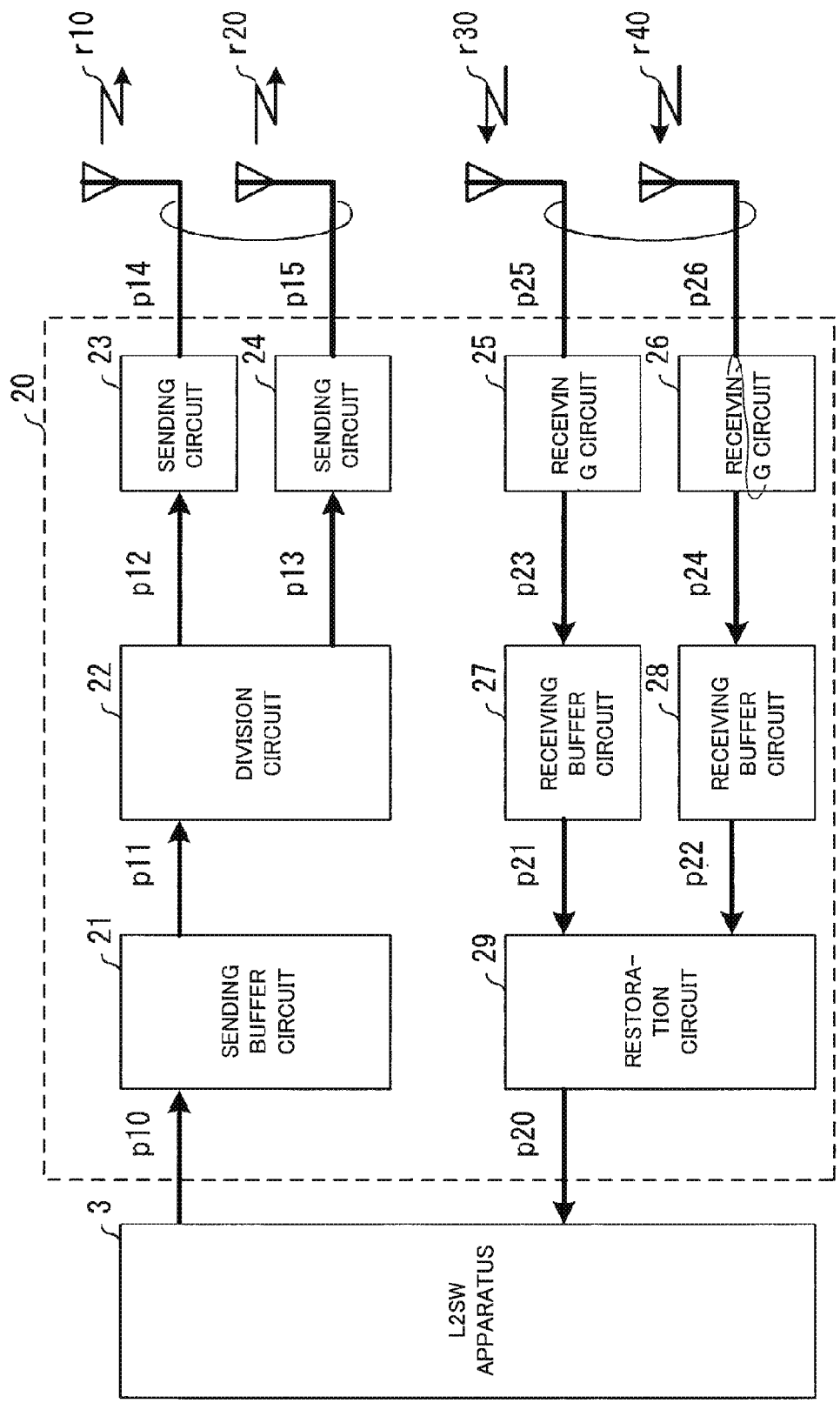
FIG. 5 is a block diagram showing a detailed configuration example of a wireless packet transmission apparatus according to the exemplary embodiment 2.

FIG. 5 is a block diagram showing a detailed configuration example of the wireless packet transmission apparatus 20. The wireless packet transmission apparatus 20 includes wireless receiving circuits 25 and 26, received block data buffer circuits 27 and 28 and a packet data restoration circuit 29 in addition to the transmission packet data buffer circuit 21, the packet data division circuit 22 and the wireless sending circuits 23 and 24 which are shown in FIG. 3. The wireless receiving circuits 25 and 26, the received block data buffer circuits 27 and 28 and the packet data restoration circuit 29 have the same circuit configurations and carry out the same processes as the wireless receiving circuits 31 and 32, the received block data buffer circuits 33 and 34 and the packet data restoration circuit 35, respectively. Here, the wireless receiving circuits 25 and 26 receive data from the wireless packet transmission apparatus 30 via wireless circuits r30 and r40, respectively. In the case of the wireless packet transmission apparatus 30, the above-mentioned packet data sending side circuit divides the packet data into the blocks, and sends the block to the wireless packet transmission apparatus 20 via the wireless circuits r30 and r40. Each unit of the wireless transmission apparatuses 20 and 30 mentioned above is realized by hardware such as IC (Integrated Circuit) or the like, software such as application software or the like or the hardware and the software.

Figure 6:
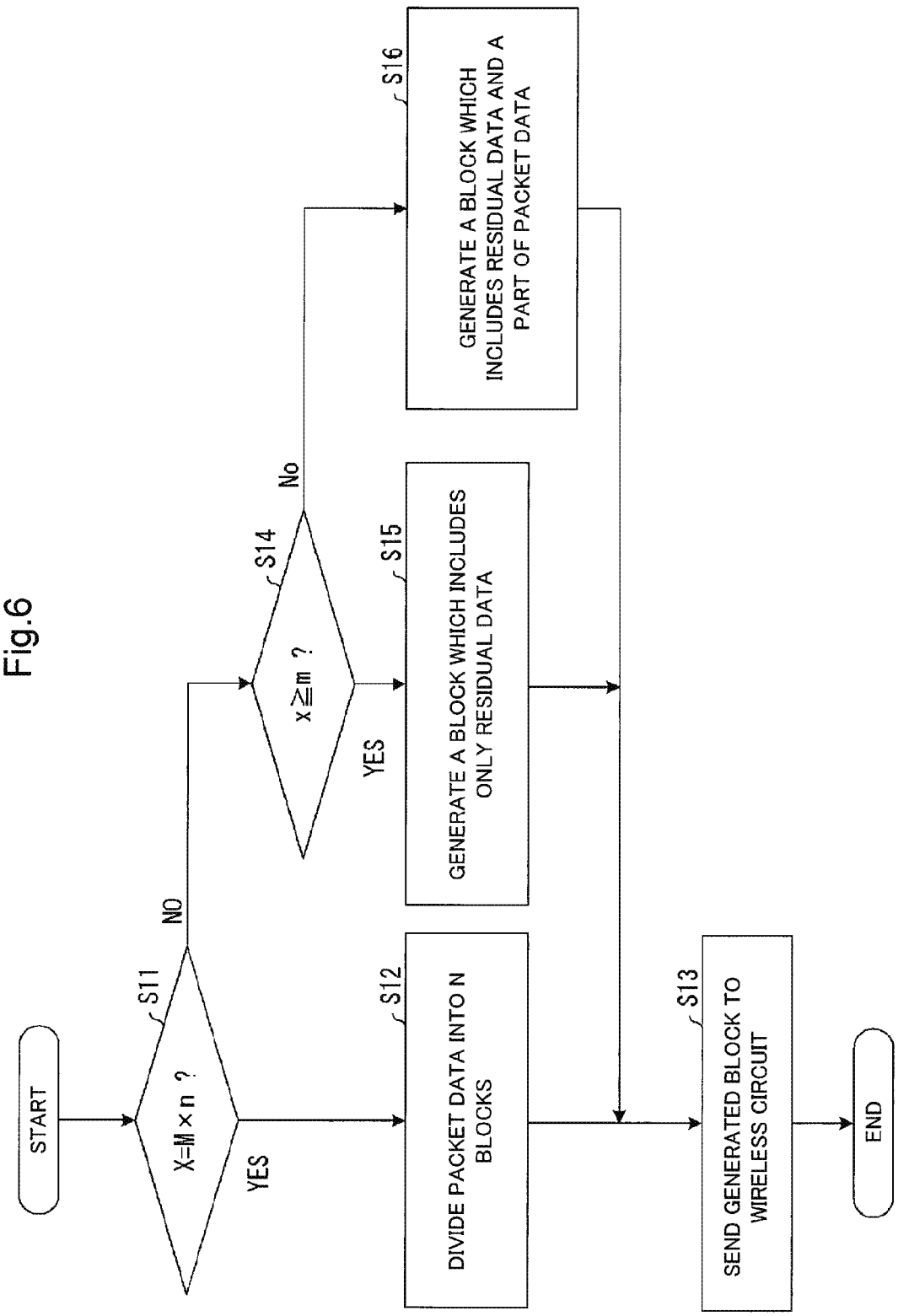
FIG. 6 is a flowchart showing an example of a division process method according to the exemplary embodiment 2.

FIG. 6 is a flowchart showing an example of a packet data division process method which the packet data division circuit 22 carries out. Hereinafter, the packet data division process which the packet data division circuit 22 carries out will be explained with reference to FIG. 6. Here, the packet data division circuit 22 carries out the packet data division process on the basis of the fixed block size and the minimum block size which are set in advance. In the following process, each unit of the packet data division circuit 22 reads data on the fixed block size, the minimum block size and the size of the packet data, which are stored in a memory, according to necessity.

Firstly, the calculation unit 222 of the packet data division circuit 22 judges whether a size X of the packet data, which are inputted from the transmission packet data buffer circuit 21, is an integral multiple (n multiple) of a fixed block size M or not (Step S11). In other words, the calculation unit 222 calculates a size x of the residual data which are generated by dividing the packet data into the blocks each having the fixed block size M, and judges whether x is 0 or not.

In the case that the calculation unit 222 judges that the size X of the packet data is n times as large as the fixed block size M, that is, in the case that the calculation unit 222 judges that the size x of the residual data is 0 (Yes in Step S11), the packet data division unit 222 divides the packet data into n blocks (Step S12). Each of the n blocks has the same fixed block size M.

The packet data division circuit 22 assigns information on a head, an end, a sequence number or the like of the block to each block as a header. Then, by distributing and outputting the blocks to the wireless sending circuits 23 and 24, the packet data division circuit 22 distributes and sends the packet data to the plural wireless circuits (wireless circuits r10 and r20).

In the case that it is judged that the size X of the packet data is not an integral multiple of the fixed block size M, that is, in the case that it is judged that the size x of the residual data is not 0 (No in Step S11), the residual data judgment unit 223 judges whether the size x of the residual data is equal to or larger than the minimum block size m or not (Step S14)

In the case that the residual data judgment unit 223 judges that the size x of the residual data is equal to or larger than the minimum block size m (Yes in Step S14), the packet data division unit 221 divides the packet data into one or more blocks each of which has the fixed block size, and one block which includes only the residual data (Step S15). Here, since the size x of the residual data is equal to or larger than the minimum block size m, the wireless packet transmission apparatus 20 can receive the residual data. Accordingly, the wireless packet transmission apparatus 30 can transmit all of the blocks into which the data packet is divided. The packet data division circuit 22 assigns a header to each block, and distributes and sends the blocks to the plural wireless circuits (Step S13).

In the case that the residual data judgment unit 223 judges that the size x of the residual data is smaller than the minimum block size m (No in Step S14), the packet data division unit 221 divides the packet data as follows. The packet data division unit 221 divides the packet data into one or more blocks each of which has the fixed block size M, a block which includes the residual data and a block whose size is equal to or smaller than the fixed block size M and is equal to or larger than the minimum block size m. Here, the block, which includes the residual data, includes a part of the packet data other than the residual data (Step S16). As mentioned above, the packet data division unit 221 divides the packet data so that the block, which includes the residual data, may have a size equal to or larger than the minimum block size m.

Here, the part of the packet data, which are included in the block including the residual data and which are different from the residual data, are data which just follow or just precede the residual data in a sequence of the packet data. In other words, the part of the data packet other than the residual data are data which exist just before or just after the residual data in the sequence of the packet data, that is, there is no data between the residual data and the part of the packet data.

The packet data division circuit 22 assigns a header to each block which is generated in the process mentioned above, and distributes and sends the blocks to the plural wireless circuits (Step S13).

Figure 7A:
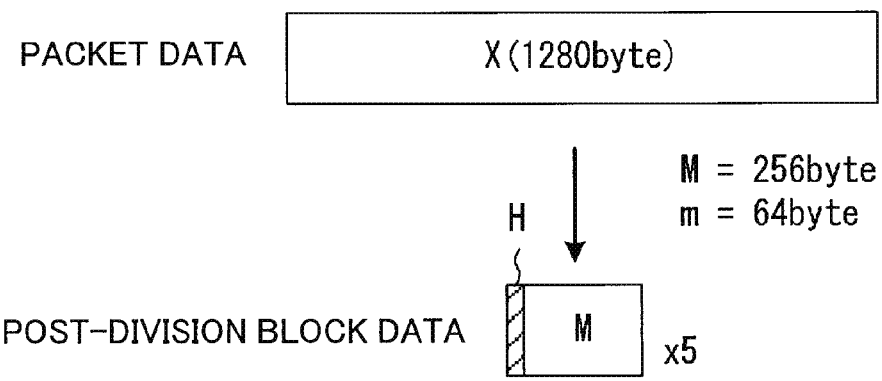
FIG. 7A is a first image diagram showing an example of a packet data division method according to the exemplary embodiment 2.
Figure 7B:
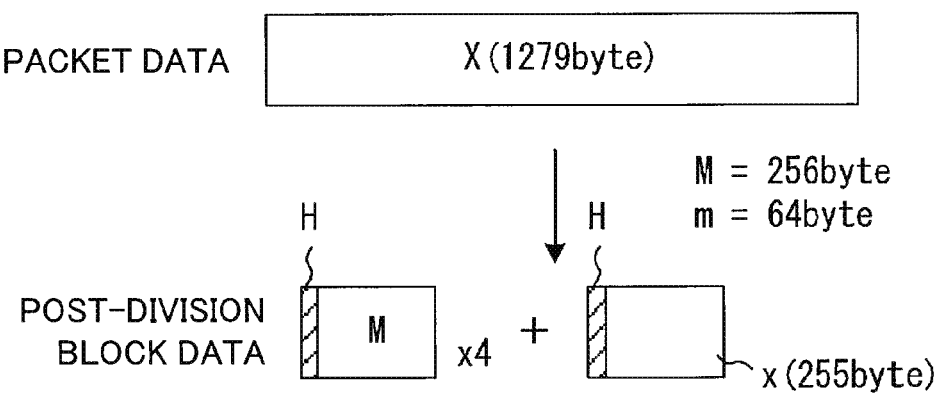
FIG. 7B is a second image diagram showing an example of the packet data division method according to the exemplary embodiment 2.
Figure 7C:
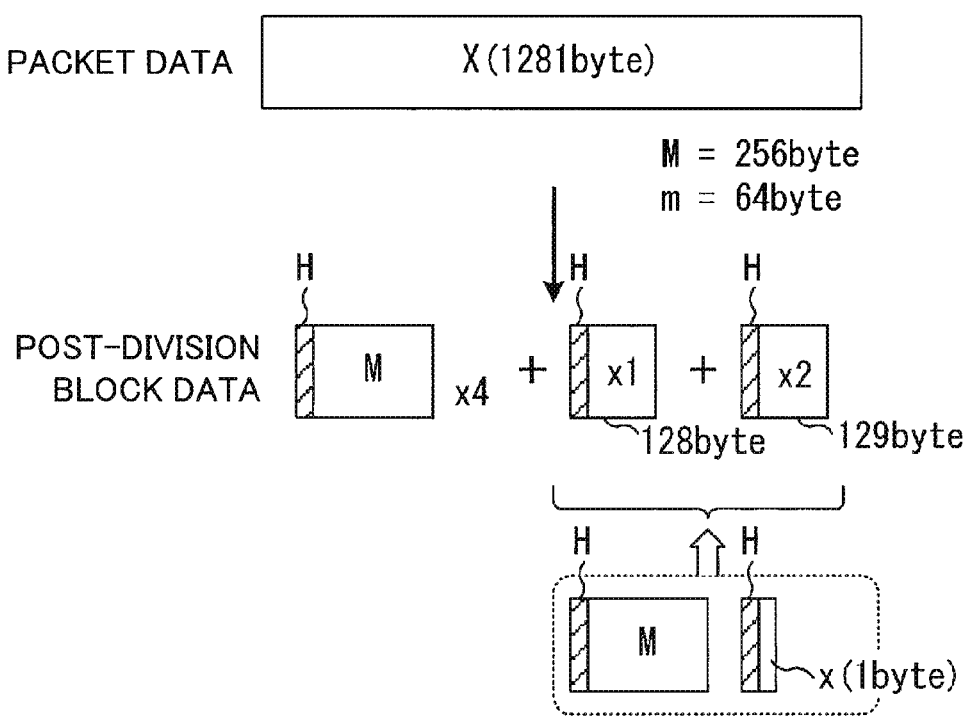
FIG. 7C is a third image diagram showing an example of the packet data division method according to the exemplary embodiment 2.

Each of FIGS. 7A to 7C is an image diagram showing an example of the packet data division method for dividing the packet data on the basis of a procedure which is described in the flowchart shown in FIG. 6. FIG. 7A shows the packet data division method applied to a case that the size X of the packet data, which are received from the L2SW apparatus 3, is 1280 bytes. Similarly, FIG. 7B shows the packet data division method applied to a case that the size X of the packet data, which are received from the L2SW apparatus 3, is 1279 bytes, and FIG. 7C shows the packet data division method applied to a case that the size X of the packet data, which are received from the L2SW apparatus 3, is 1281 bytes. Here, in every case, the fixed block size M is 256 bytes, and the minimum block size m is 64 bytes.

FIG. 7A indicates that the packet data of 1280 bytes are divided into 5 blocks of 256 bytes. In Step S11 shown in FIG. 6, the calculation unit 222 judges whether the size X of the packet data is an integral multiple of the fixed block size M or not. Here, since the size X of the packet data is 1280 bytes, and the fixed block size is 256 bytes, the size of the packet data is just 5 times as large as the fixed block size.

Accordingly, in Step S11 shown in FIG. 6, the packet data division circuit 22 judges that the size X of the packet data is an integral multiple of the fixed block size M (Yes in Step S11).

The packet data division unit 221 divides the packet data into 5 blocks (Step S12). Each of these 5 blocks has a block size of 256 bytes. Then, the packet data division circuit 22 assigns information on a head, an end and a sequence number of the block to each block as a header (header is denoted as 'H' in FIGS. 7A to FIG. 7C). The packet data division circuit 22 distributes and sends the 5 blocks, to each of which the header is assigned, to the wireless circuits (Step S13).

FIG. 7B indicates that the packet data of 1279 bytes are divided into 4 blocks of 256 bytes and one block of 255 bytes. The calculation unit 222 judges whether the size X of the packet data is an integral multiple of the fixed block size M or not. In this case, since the size of the data packet is 1279 bytes, and the fixed block size is 256 bytes, the size of the packet data is not an integral multiple of the fixed block size. Accordingly, in Step S11 shown in FIG. 6, the calculation unit 222 judges that the size X of the packet data is not an integral multiple of the fixed block size M (No in Step S11). At this point of time, the calculation unit 222 calculates the size x of the residual data, and finds that the size x is 255 bytes.

The residual data judgment unit 223 judges whether the size x of the residual data, which are left when dividing the packet data by the fixed block size M, is equal to or larger than the minimum block size m or not (Step S14). In FIG. 7B, since the size x of the residual data is 255 bytes, and the minimum block size m is 64 bytes, the size x of the residual data is larger than the minimum block size m. Accordingly, the residual data judgment unit 223 judges that the size x of the residual data is equal to or larger than the minimum block size m (Yes in Step S14), and divides the packet data into 4 blocks and one block which includes only the residual data (Step S15). Each of these 4 blocks has the same fixed block size M. The packet data division circuit 22 assigns a header to each block, and distributes and sends the blocks, to each of which the header is assigned, to the plural wireless circuits (Step S13).

FIG. 7C indicates that the packet data of 1281 bytes are divided into 4 blocks of 256 bytes, one block of 128 bytes and one block of 129 bytes. In the flow shown in FIG. 6, the packet data division circuit 22 judges whether the size X of the packet data which are inputted from the transmission packet data buffer circuit 21 is an integral multiple of the fixed block size M or not (Step S11). In this case, since the size X of the data packet is 1281 bytes, and the fixed block size M is 256 bytes, the size X of the packet data is not an integral multiple of the fixed block size M. Accordingly, in Step S11 shown in FIG. 6, the calculation unit 222 judges that the size X of the packet data is not an integral multiple of the fixed block size M (No in Step S11). At this point of time, the calculation unit 222 calculates the size x of the residual data, and finds that the size x is 1 byte.

The residual data judgment unit 223 judges whether the size x of the residual data, which are left when dividing the packet data by the fixed block size M, is equal to or larger than the minimum block size m or not (Step S14). In FIG. 7C, since the size x of the residual data is 1 byte, and the minimum block size m is 64 bytes, the size x of the residual data is smaller than the minimum block size m. Accordingly, the residual data judgment unit 223 judges that the size x of the residual data is smaller than the minimum block size m (No in Step S14)

The packet data division unit 221 divides the packet data into 4 blocks each of which has the fixed block size M, a block having a size x1 which is equal to or smaller than the fixed block size M and which is equal to or larger than the minimum block size m, and a block which includes the residual data and which has a size x2 (Step S16). Here, the size x1 is 128 bytes, and the size x2 is 129 bytes. This is because data, which include the residual data of 1 byte and a part of the packet data of 256 bytes (fixed block size M), are divided into 2 blocks of almost the same size. The packet data division circuit 22 assigns a header to each block which is generated in the above-mentioned process, and distributes and sends the generated blocks to the plural wireless circuits (Step S13).

Figure 8A:
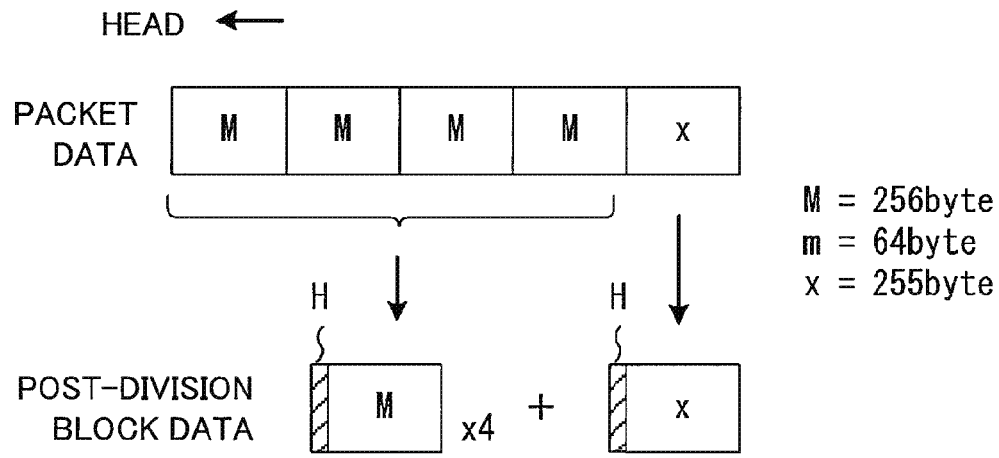
FIG. 8A is a first image diagram showing details of the packet data division method according to the exemplary embodiment 2.
Figure 8B:
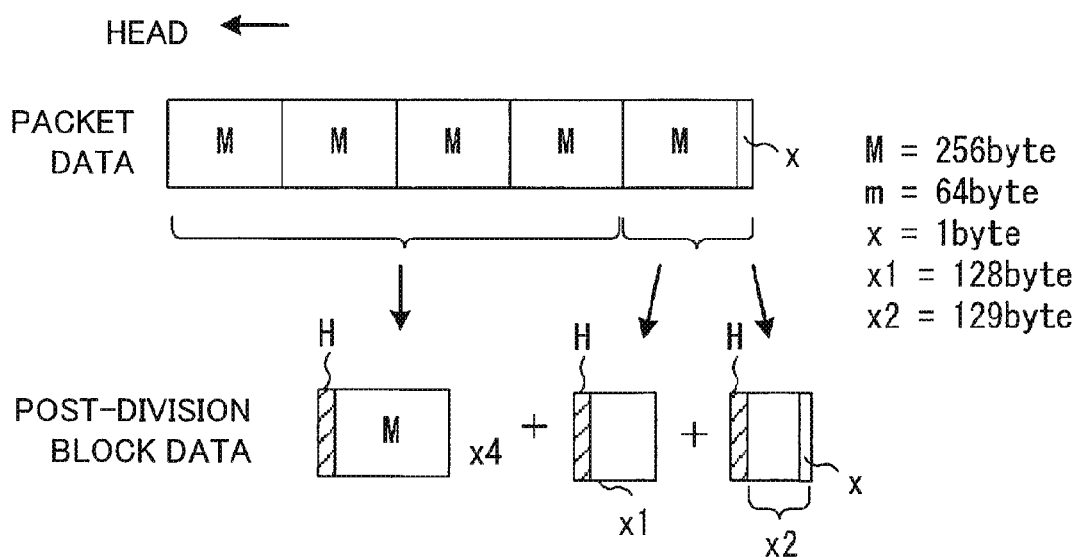
FIG. 8B is a second image diagram showing details of the packet data division method according to the exemplary embodiment 2.

FIG. 8A and FIG. 8B show details of the division processes shown in FIG. 7B and FIG. 7C, respectively. In FIG. 8A and FIG. 8B, a left end of the packet data indicates a head of the packet data, and a right end indicates an end of the packet data.

In FIG. 8A, the packet data division unit 221 divides 1024 bytes from the head of the packet data into 4 blocks each of which has the fixed block size M. Then, the packet data division unit 221 generates one block including only the residual data of 255 bytes in the tail of the packet data. The packet data division circuit 22 assigns a header to each of the generated blocks.

In FIG. 8B, the packet data division unit 221 divides 1024 bytes from the head of the packet data into 4 blocks each of which has the fixed block size M. Then, the packet data division unit 221 divides the residual data of 1 byte in the tail, and data of second last end side 256 bytes into a block which has the size x1 of 128 bytes, and a block which has the size x2 of 129 bytes. Here, the block which has the size of 129 bytes includes the residual data of 1 byte, and the data of 128 bytes which are corresponding to the part of the packet data other than the residual data. The data of 128 bytes, which are corresponding to the part of the packet data other than the residual data, are data which exist on the second last end side of the packet data while the residual data exist on the last end side (that is, the data of 128 bytes exist just before the residual data.). Accordingly, there is no data between the residual data and the data of 128 bytes.

As mentioned above, the packet data division circuit 22 divides the packet data according to the method which is based on the size of the packet data, that is, which is different dependently on the size of the packet data.

Here, the packet data division circuit 22 may carry out the flow process shown in FIG. 6 together with dividing the packet data. For example, in the case that the size of the packet data is 1281 bytes, the packet data division unit 221 divides block data from the head side of the packet data into blocks each of which has the fixed block size of 256 bytes, and assigns a header to each the block, and distributes the blocks to the wireless circuits. Simultaneously, the calculation unit 222 calculates the size x of the residual data on the basis that the size of the packet data is 1281 bytes, and finds that the size x of the residual data is 1 byte. The residual data judgment unit 223 judges that the size x of the residual data is smaller than the minimum block size m, and divides the residual data of 1 byte in the tail and the data of the second end side 256 bytes out of the packet data into the block which has the size of 128 bytes and the block which has the size of 129 bytes. Then, the packet data division circuit 22 assigns a header to each division block, and distributes the blocks to the wireless circuits.

Or, the packet data division circuit 22 may divide all of the packet data into the blocks, and afterward distribute and send the blocks to the wireless circuits 23 and 24. Here, by carrying out the flow process shown in FIG. 6 together with dividing the packet data, it is possible to send the packet data to the wireless packet transmission apparatus 30 in a short time.

Figure 9A:
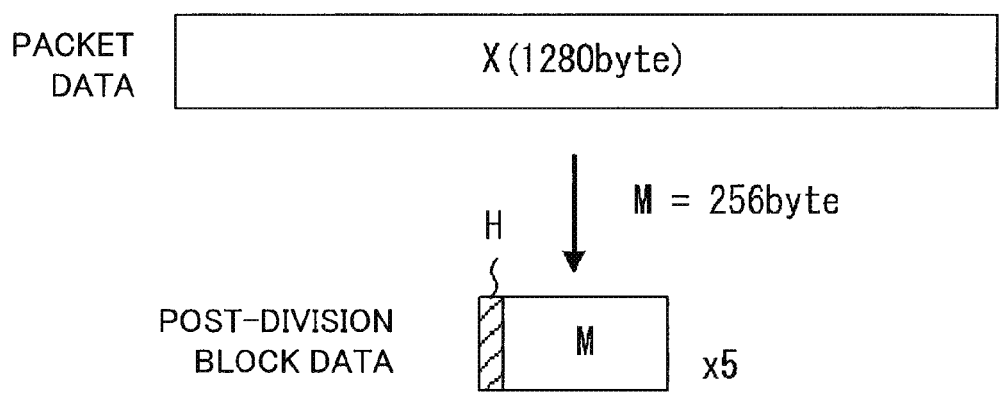
FIG. 9A is a first image diagram showing a packet data division method according to a related art.
Figure 9B:
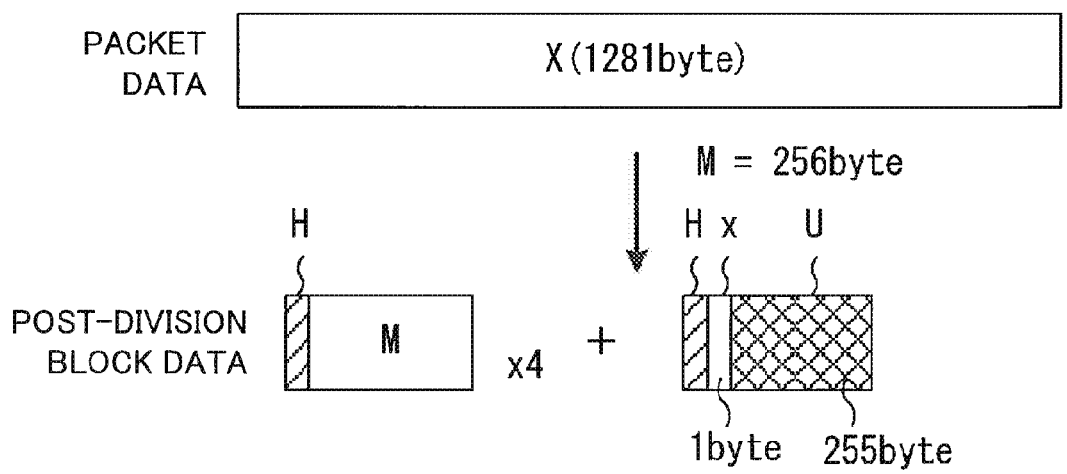
FIG. 9B is a second image diagram showing the packet data division method according to the related art.

Each of FIG. 9A and FIG. 9B is an image diagram showing a packet data division method according to a related art. FIG. 9A shows the packet data division method which is applied to a case that the packet data, which are received from the L2SW apparatus 3, have a size of 1280 bytes, and FIG. 9B shows the packet data division method which is applied to a case that the packet data, which are received from the L2SW apparatus 3, has a size of 1281 bytes. Here, in FIG. 9A and FIG. 9B, a header (denoted as 'H') is assigned to a block.

FIG. 9A indicates that packet data of 1280 bytes are divided into 5 blocks of 256 bytes. In this case, since the size of the packet data can be divided by the fixed block size M, a padding process is not carried out. Accordingly, data which are in a used area do not exist in the block.

However, in the case that the size of the packet data cannot be divided by the fixed block size, the unused area is caused in the block. FIG. 9B indicates that the packet data of 1281 bytes are divided into 6 blocks of 256 bytes. The packet data are divided into the blocks each of which has the fixed block size of 256 bytes, and the residual data which has the size x of 1 byte. According to the method of the related art, one block, which has the fixed block size of 256 bytes, is generated by adding an unused area U of 255 bytes (by carrying out the padding process) to the residual data of 1 byte. Then, the packet transmission apparatus transmits the generated 6 blocks. In this case, since the unused area is caused the block, packet data transmission efficiency becomes degraded.

In contrast, the padding process is not carried out in the generation process shown in FIG. 7A to FIG. 7C. Therefore, it is possible to avoid transmission of useless data which are corresponding to the unused area, and to realize enhancement of data transmission efficiency.

Furthermore, as shown in FIG. 7C, on the basis of the data of 256 bytes (corresponding to one block which has the fixed block size M) and the residual data, the packet data division circuit 22 generates the block which includes the residual data, and the block whose data size is equal to or smaller than the fixed block size M and is equal to or larger than the minimum block size m. The packet data division circuit 22 generates 4 blocks each of which has the fixed block size M in addition to the generated blocks mentioned above. As mentioned above, by generating the block, which includes the residual data, on the basis of only the residual data and the data corresponding to one block which has the fixed block size M, the packet data division circuit 22 can generate one block, whose size is equal to or larger than the minimum block size m and which includes the residual data, in small number of processes. Moreover, according to the method, it is possible to carry out the process of generating the block, which includes the residual data, together with dividing the packet data from the head side of the packet data into the blocks and distributing the blocks to the wireless circuits, as mentioned above. Specifically, in FIG. 7C, by dividing the packet data, the transmission data division unit 221 generates the block, which has the size of 256 bytes, before generating the block of 129 bytes which includes the residual data, and the block which has the data size of 128 bytes. Then, the sending circuits 23 and 24 transmit the blocks, which the transmission data division unit 221 generates, in turn. Therefore, an effect that it is possible to start transmission early in comparison with a case of starting transmission after division into the blocks is completed.

Here, the packet data division unit 221 divides a total of the residual data of one byte, and the part of the packet data of 256 bytes (fixed block size M) into two blocks of almost the equal data size. Here, 'almost equal' includes a case that a size of one block is different from a size of another block by one byte to several bytes. In other words, 'almost equal' includes a case that there is a difference between sizes of two blocks, which are generated by division, to such an extent that transmission times of the two blocks from the wireless packet transmission apparatus 20 to the wireless packet transmission apparatus 30 are regarded to be equal each other. By virtue of the above, it is possible to make the transmission times of the two blocks, which are generated by division, from the wireless packet transmission apparatus 20 to the wireless packet transmission apparatus 30 almost equal. Therefore, it is possible to make the packet data restoration circuit 35 of the receiving side wireless packet transmission apparatus 30 carry out the restoration process early and accurately in comparison with a case that there is the difference between the transmission times of the two blocks from the wireless packet transmission apparatus 20 to the wireless packet transmission apparatus 30.

In FIG. 7C, the part of the packet data, which are included in the block including the residual data and which are different from the residual data, are data which just follow or just precede the residual data. Here, even if the part of the packet data are not data which just follow or just precede the residual data, it is possible to realize enhancement of data transmission efficiency. However, in the case that the part of the packet data are data which just follow or just precede the residual data, a time required for the packet data restoration process, which is carried out by the packet data restoration circuit 35 of the wireless packet transmission apparatus 30, becomes short, and consequently it is possible to carry out the restoration process efficiently.

Here, while it has been explained in FIG. 7C that the fixed block size M is 256 bytes, and the minimum block size m is 64 bytes, other values may be applicable. However, in order to generate two blocks, each of whose sizes is equal to or larger than the minimum block size m, on the basis of the residual data and the data whose size is the fixed block size, it is necessary that the fixed block size is 2 or more times as large as the minimum block size.

In the case that the size of the residual data is equal to or larger than the minimum block size as shown in FIG. 7B, the packet data division circuit 22 assigns a header to the residual data as it is to transmit the residual data including the header.

Therefore, it is possible to reduce a process time which the packet data division circuit 22 consumes.

In the case that there is no residual data (that is, size of residual data is 0), the packet data division unit 221 divides the packet data into the blocks each of which has the fixed block size to transmit the blocks. Therefore, the packet data division circuit 22 can transmit the packet data efficiently.

Exemplary Embodiment 3

Hereinafter, an exemplary embodiment 3 of the present invention will be explained with reference to drawings. The exemplary embodiment 3 shows another application example of the data transmission apparatus according to the present invention. Here, parts which have already been explained in the exemplary embodiments 1 and 2 are properly omitted.

Figure 10:
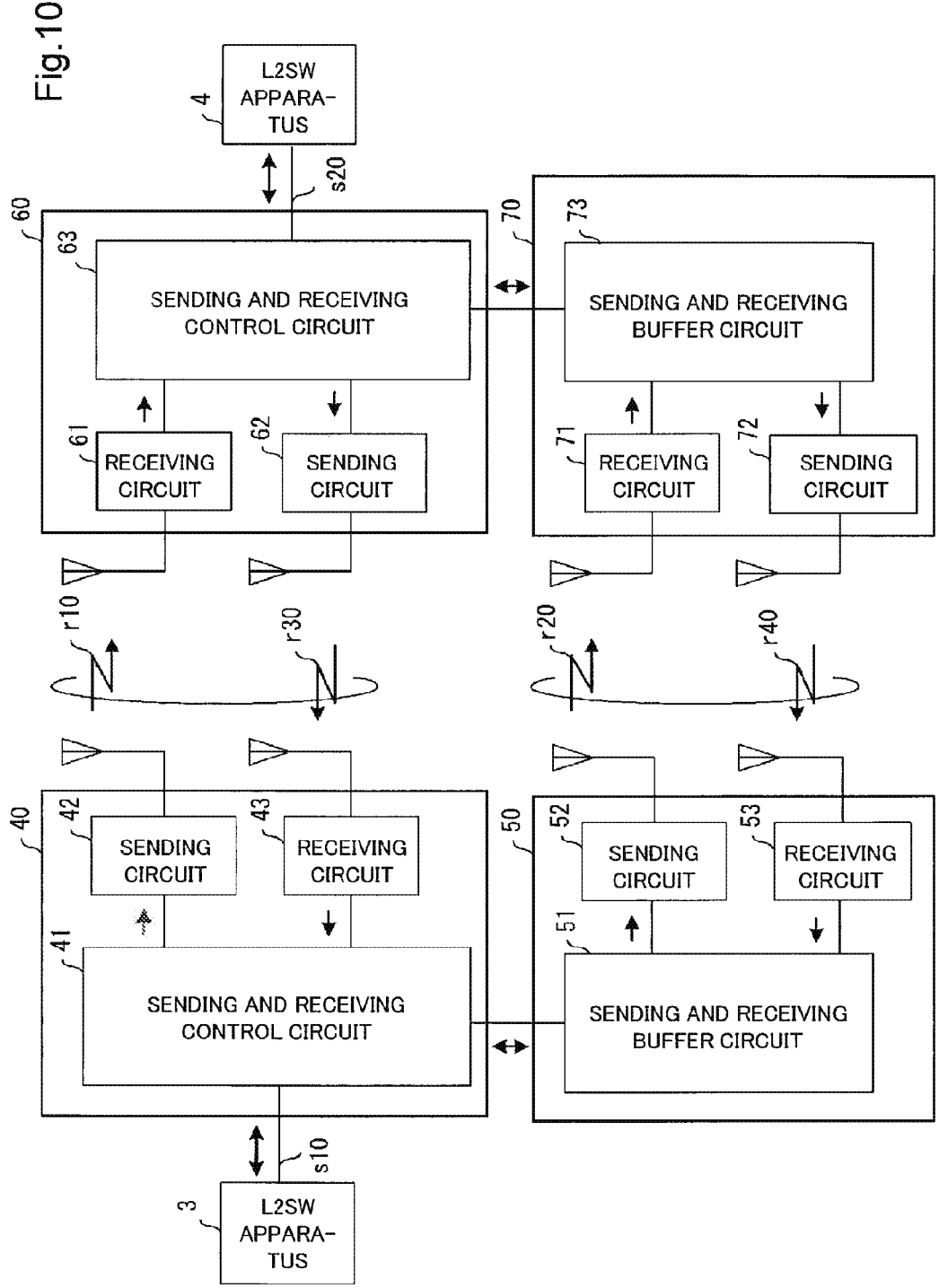
FIG. 10 is a block diagram showing an example of a wireless communication system according to an exemplary embodiment 3.

FIG. 10 shows a wireless communication system which includes the L2SW apparatuses 3 and 4 and wireless packet transmission apparatuses 40, 50, 60 and 70. In FIG. 10, the L2SW apparatus 3 and the wireless packet transmission apparatus 40 are connected each other via the LAN circuit s10, and the L2SW apparatus 4 and the wireless packet transmission apparatus 60 are connected each other via the LAN circuit s20. The wireless packet transmission apparatus 40 and the wireless packet transmission apparatus 60 are connected each other via the wireless circuit r10 and the wireless circuit r30. The wireless packet transmission apparatus 50 and the wireless packet transmission apparatus 60 are connected each other via the wireless circuit r20 and the wireless circuit r40. The wireless circuits r10 to r40 are the same as the wireless circuits r10 to r40 shown in FIG. 5, respectively.

The wireless packet transmission apparatus 40 includes a sending and receiving control circuit 41, a wireless sending circuit 42 and a wireless receiving circuit 43. The wireless packet transmission apparatus 50 includes a transmission and received data buffer circuit 51, a wireless sending circuit 52 and a wireless receiving circuit 53. The wireless packet transmission apparatus 60 includes a wireless receiving circuit 61, a wireless sending circuit 62 and a sending and receiving control circuit 63. The wireless packet transmission apparatus 70 includes a wireless receiving circuit 71, a wireless sending circuit 72 and a transmission and received data buffer circuit 73.

Figure 11:
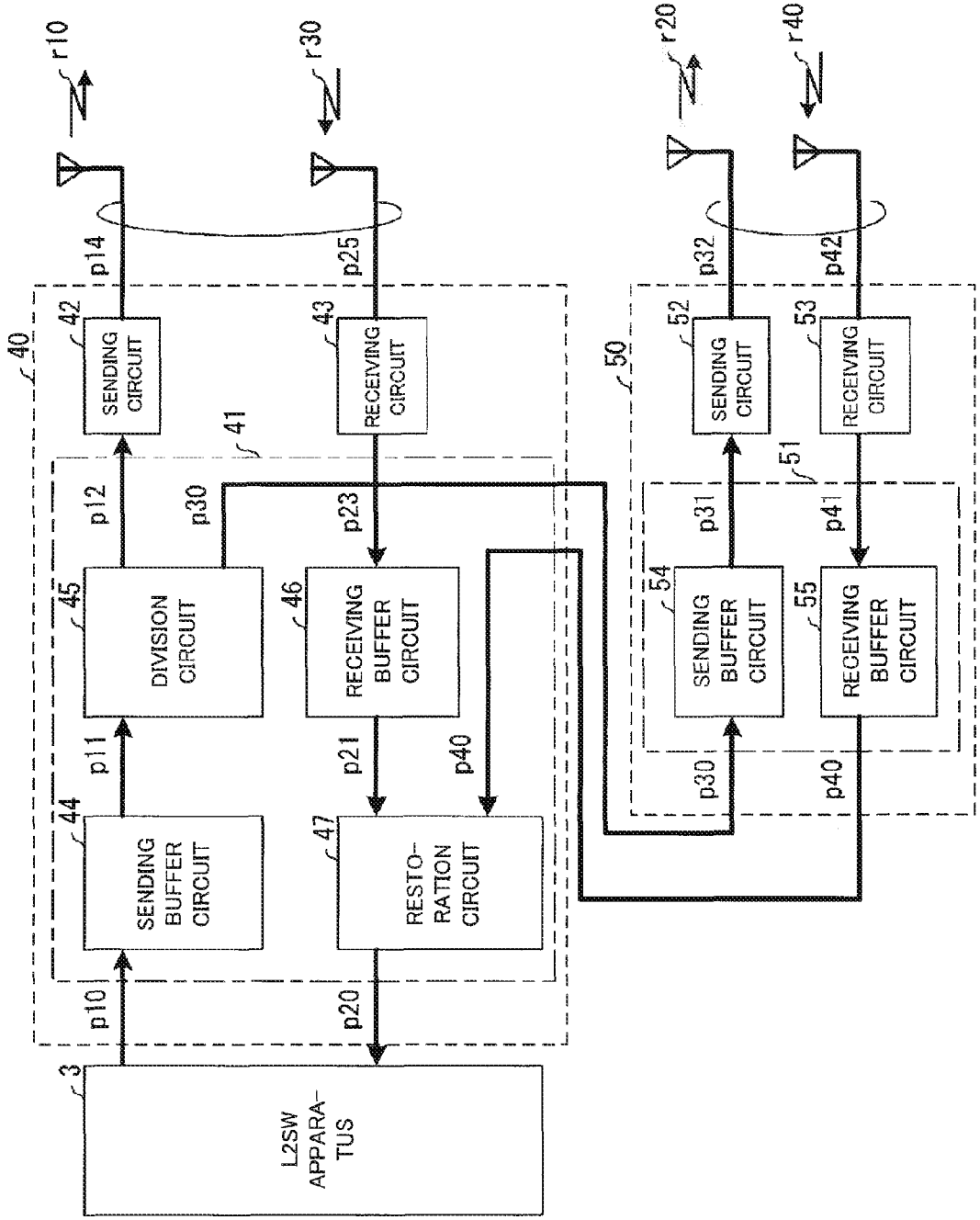
FIG. 11 is a block diagram showing a detailed configuration example of a wireless packet transmission apparatus according to the exemplary embodiment 3.

Details of configurations of the wireless packet transmission apparatus 40 and the wireless packet transmission apparatus 50 will be explained in the following with reference to FIG. 11. FIG. 11 is a block diagram showing an example of configurations of the wireless packet transmission apparatus 40 and the wireless packet transmission apparatus 50.

The sending and receiving control circuit 41 of the wireless packet transmission apparatus 40 includes a transmission packet data buffer circuit 44, a packet data division circuit 45, a received block data buffer circuit 46 and a packet data restoration circuit 47. The transmission packet data buffer circuit 44, the packet data division circuit 45, the received block data buffer circuit 46 and the packet data restoration circuit 47 have the same circuit configurations and carry out the same processes as the transmission packet data buffer circuit 21, the packet data division circuit 22, the received block data buffer circuit 27 and the packet data restoration circuit 29 in FIG. 5, respectively. The wireless sending circuit 42 and the wireless receiving circuit 43 have the same circuit configurations and carry out the same processes as the wireless sending circuit 23 and the wireless receiving circuit 25 in FIG. 5, respectively.

The wireless packet transmission apparatus 40 has a configuration in which the wireless sending circuit 24, the wireless receiving circuit 26 and the received block data buffer circuit 28 are deleted from the wireless packet transmission apparatus 20 shown in FIG. 5. A transmission division block signal p30, which is outputted from the packet data division circuit 45, is inputted into the wireless packet transmission apparatus 50, and a receiving division block signal p40, which is inputted into the packet data restoration circuit 47, is outputted from the wireless packet transmission apparatus 50.

The transmission and received data buffer circuit 51 of the wireless packet transmission apparatus 50 includes a transmission packet data buffer circuit 54 and a received block data buffer circuit 55. The wireless sending circuit 52, the wireless receiving circuit 53, the transmission packet data buffer circuit 54 and the received block data buffer circuit 55, which are installed in the wireless packet transmission apparatus 50, have the same circuit configurations and carry out the same processes as the wireless sending circuit 24, the wireless receiving circuit 26, the transmission packet data buffer circuit 21 and the received block data buffer circuit 28 in FIG. 5, respectively.

Here, an operation of the wireless packet transmission apparatus 50 will be explained. The transmission packet data buffer circuit 54 carries out a buffering process to the transmission division block signal p30 which is inputted from the wireless packet transmission apparatus 40, and outputs the buffered transmission division block signal p30 to the wireless sending circuit 52 as a transmission division block signal p31.

Here, the transmission division block signal p30, which is inputted from the wireless packet transmission apparatus 40, is the same as the transmission division block signal p13 which is generated by the packet data division circuit 22 of the wireless packet transmission apparatus 20 shown in FIG. 5.

The wireless sending circuit 52 carries out a wireless sending process, such as a process of multiplexing to a wireless frame, a modulation process, DA conversion, frequency conversion and the like, to the transmission division block signal p31 which is inputted from the transmission packet data buffer circuit 54. Afterward, the transmission division block signal p31 is sent to the wireless circuit r20 as a transmission wireless signal p32.

The wireless receiving circuit 53 carries out a wireless receiving process, such as frequency conversion, AD conversion, a demodulation process and the like, to a received wireless signal p42 which is inputted from the wireless circuit r40. Afterward, the received wireless signal p42 is outputted to the received block data buffer circuit 55 as a received wireless block signal p41.

The received block data buffer circuit 55 carries out a buffering process to the received wireless block signal p41 which is inputted from the wireless receiving circuit 53, and outputs the buffered received wireless block signal p41 to the packet data restoration circuit 47 as the received division block signal p40.

Here, the received division block signal p40, which is outputted to the wireless packet transmission apparatus 40, is the same as the received division block signal p22 which is received by the packet data restoration circuit 29 of the wireless packet transmission apparatus 20 shown in FIG. 5.

Here, the wireless receiving circuit 61, the wireless sending circuit 62 and the sending and receiving control circuit 63 of the wireless packet transmission apparatus 60 have the same circuit configurations and carry out the same processes as the wireless receiving circuit 43, the wireless sending circuit 42 and the sending and receiving control circuit 41, respectively. The wireless receiving circuit 71, the wireless sending circuit 72 and the transmission and received data buffer circuit 73 have the same circuit configurations and carry out the same processes as the wireless receiving circuit 53, the wireless sending circuit 52 and the transmission and received data buffer circuit 51, respectively. Each unit of the wireless packet transmission apparatuses 50 and 60 is realized by hardware such as IC (Integrated Circuit) or the like, software such as application software or the like or the hardware and the software.

By the above, the wireless communication system, which carries out the wireless communication by use of plural wireless packet transmission apparatuses, has been explained. Since also the wireless communication system can carry out the process which is the same as the process in the exemplary embodiment 2, it is possible to realize enhancement of data transmission efficiency.

Exemplary Embodiment 4

Hereinafter, an exemplary embodiment 4 of the present invention will be explained with reference to a drawing. The exemplary embodiment 4 shows another application example of the data transmission apparatus according to the present invention. Here, parts which have already been explained in the exemplary embodiments 1 to 3 are properly omitted.

Figure 12:
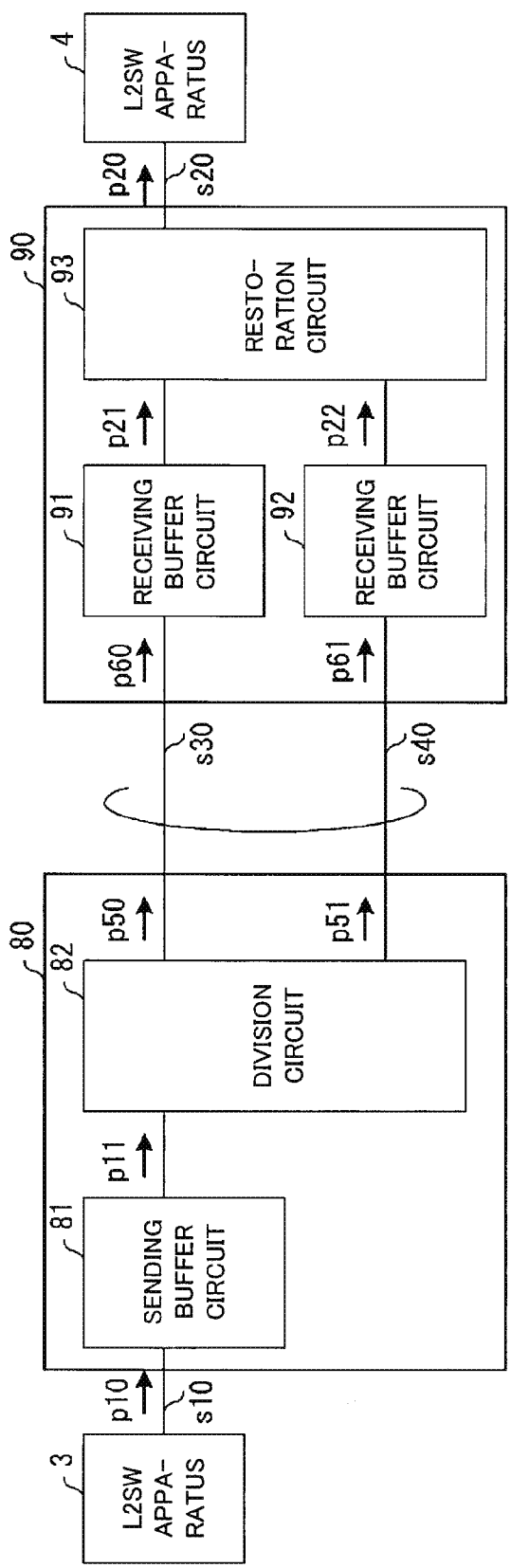
FIG. 12 is a block diagram showing an example of a wireless communication system according to an exemplary embodiment 4.

FIG. 12 shows a communication system which includes the L2SW apparatuses 3 and 4, and packet transmission apparatuses 80 and 90. In FIG. 12, the L2SW apparatus 3 and the packet transmission apparatus 80 are connected each other via the LAN circuit s10, and the L2SW apparatus 4 and the packet transmission apparatus 90 are connected each other via the LAN circuit s20.

The packet transmission apparatus 80 includes a transmission packet data buffer circuit 81 and a packet data division circuit 82, and the packet transmission apparatus 90 includes a received block data buffer circuits 91 and 92, and a packet data restoration circuit 93.

The packet transmission apparatus 80 is a packet transmission apparatus in which the wireless sending circuits 23 and 24 are deleted from the wireless packet transmission apparatus 20 shown in FIG. 3. The packet transmission apparatus 90 is a packet transmission apparatus which has a configuration obtained by deleting the wireless receiving circuits 31 and 32 from the wireless packet transmission apparatus 30 shown in FIG. 3.

The transmission packet data buffer circuit 81 and the packet data division circuit 82 have the same circuit configurations and carry out the same processes as the transmission packet data buffer circuit 21 and the packet data division circuit 22 in FIG. 3, respectively. The packet data division circuit 82 outputs a transmission division block signal p50 and a transmission division block signal p51 which are generated by dividing transmission data into blocks. The transmission division block signal p50 is outputted to the packet transmission apparatus 90 via a LAN circuit s30, and the transmission division block signal p51 is outputted to the packet transmission apparatus 90 via a LAN circuit s40.

The received block data buffer circuits 91 and 92 have the same circuit configurations as the received block data buffer circuits 33 and 34 in FIG. 3, respectively. The received block data buffer circuit 91 carries out a buffering process to a received transmission division block signal p60 (the same signal as transmission division block signal p50), and afterward outputs the buffered transmission division block signal p60 to the packet data restoration circuit 93 as the received division block signal p21. The received block data buffer circuit 92 carries out the same process.

The packet data restoration circuit 93 has the same circuit configuration and carries out the same process as the packet data restoration circuit 35 in FIG. 33, respectively.

Here, for making explanation simplified, FIG. 12 shows only a packet data sending side circuit (transmission packet data buffer circuit 81 and packet data division circuit 82) in the case of the packet transmission apparatus 80, and only a packet data receiving side circuit (received block data buffer circuits 91 and 92, and packet data restoration circuit 93) in the case of the packet transmission apparatus 90. Actually, the packet transmission apparatus 80 and the packet transmission apparatus 90 have the same configuration. That is, the packet transmission apparatus 80 includes furthermore the packet data receiving side circuit not shown in the figure, and the packet transmission apparatus 90 includes the packet data sending side circuit not shown in the figure. The receiving side circuit and the sending side circuit have the same configurations as ones shown in FIG. 12. Each unit of the packet transmission apparatuses 80 and 90 is realized by hardware such as IC (Integrated Circuit) or the like, software such as application software or the like or the hardware and the software.

By the above, the communication system, which carries out the wireless communication by use of not the wireless circuit but the plural LAN circuits, has been explained. Since also the wireless communication system can carry out the same process as the process in the exemplary embodiments 2 and 3, it is possible to realize enhancement of data transmission efficiency.

At present, while there are many communication services and an amount of network traffic becomes increasing, an art to make line capacity increasing is required. The present invention is conceived to realize enhancement of data transmission efficiency on the basis of such the background art. The present invention is applicable to a technical field on data transmission. The present invention is applicable to, for example, packet data transmission which includes wireless packet data transmission.

Here, the present invention is not limited to the above-mentioned exemplary embodiment, and it is possible to make changes properly within the scope of intention.

For example, in FIG. 7C of the exemplary embodiment 2, the packet data division unit 221 does not have to divide a total of the residual data of 1 byte and the data of 256 bytes into 2 blocks which have the same size. The packet data division unit 221 can carry out another division method as far as a block, whose size is equal to or smaller than the fixed block size M and is equal to or larger than the minimum block size m, is generated according to the method. For example, the packet data division unit 221 may divide a total of the residual data of 1 byte and the data of 256 bytes into a block of 64 bytes which includes the residual data of 1 byte, and a block of 193 byte (first data size). Also by carrying out the above-mentioned process, since many blocks each of which has the fixed block size M are generated, a time required for the packet data division 22's carrying out the process is shortened in comparison with a case of generating many blocks each of which has a size different from the fixed block size M. That is, it is possible to carry out the division process efficiently.

However, by the packet data division unit 221's dividing data, which include the residual data of 1 byte and the data of 256 bytes, into 2 blocks which have the same data size, it is possible to make transmission times, which are required for transmitting the 2 blocks to the wireless packet transmission apparatus 30, the same each other. Accordingly, from a point of view of transmission efficiency, it is desirable that the packet data division circuit 221 divides data, which includes the residual data, into 2 blocks which have the same data size.

In FIG. 7C, the block of 128 bytes and the block of 129 bytes, which are generated by division, does not have to be transmitted at the same time, that is, may be transmitted at times different each other. Furthermore, when carrying out the packet data division process, the transmission data division unit 221 may generate the block of 128 bytes and the block of 129 bytes at first. Or, the transmission data division unit 221 may generate the block of 128 bytes firstly and generate the block of 129 bytes finally. However, it is desirable that an order of data in the packet data, which are transmitted from the wireless packet transmission apparatus 20 to the wireless packet transmission apparatus 30, is identical with an order of data in the original packet data. The reason is to make the packet data restoration process carried out faster and more accurately.

In FIG. 7C, the packet data division unit 221 may divide the packet data into one or more blocks each having a second data size which is different from the fixed block size M and is equal to or larger than the minimum block size m, and one or more blocks each having a third data size which is equal to or smaller than the fixed block size M and is equal to or larger than the minimum block size m. For example, in the case that the size X of the packet data is 1816 bytes, the packet data division unit 221 may divide the packet data so as to generate 7 blocks of 250 bytes different from the fixed block size M (256 bytes), and one block of 66 bytes equal to or smaller than the fixed block size M and equal to or larger than the minimum block size m. Here, it is unnecessary that the blocks, each of which has the second data size, have exactly equal data size. The blocks, each of which has the second data size, may have above-mentioned 'almost equal' data size. For example, instead of generating 7 blocks of 250 bytes, the packet data division unit 221 may generate one block of 248 bytes, one block of 252 bytes and 5 blocks of 250 bytes. The above is similar to the third data size.

In the case that the size X of the packet data is 1816 bytes, the packet data division unit 221 can divide the packet data into 7 blocks each of which has the fixed block size M, and one block of 24 bytes. Here, since the block of 24 bytes has a size smaller than the minimum block size m, the wireless packet transmission apparatus cannot transmit the block of 24 bytes as it is. Accordingly, the above-mentioned division process can be regarded as a process in which the packet data division unit 221 assigns 6 bytes of each of 7 blocks, each of which has the fixed block size M, to the block of 24 bytes to generate blocks each of whose sizes is equal to or larger than the minimum block size m.

Also by carrying out the above-mentioned process, it is possible to reduce types of size of the blocks generated by dividing the packet data. Therefore, in comparison with a case of dividing the packet data so as to make the size of block randomized, it is possible for the packet data division circuit 22 to carry out the division process more efficiently. Furthermore, each transmission time of blocks, each of which has the same size, from the wireless packet transmission apparatus 20 to the wireless packet transmission apparatus 30 is regarded to be the same. That is, by transmitting blocks, each of which has the same size, from the wireless packet transmission apparatus 20 in an order, the blocks reaches the receiving side wireless packet transmission apparatus 30 in the order of transmission from the wireless packet transmission apparatus 20. Therefore, it is possible for the packet data restoration circuit 35 of the wireless packet transmission apparatus 30 to carry out the packet data restoration process with accuracy.

In the case of the exemplary embodiment 2, the wireless packet transmission apparatus 20 transmits the blocks by use of two wireless circuits r10 and r20. Accordingly, it is desirable from a point of view of data transmission efficiency that at least one out of number of the plural blocks having the second data size and number of the plural blocks having the third data size is even, since it is possible to send one block via the wireless circuit r10 and the other one block via the wireless circuit r20 at the same time. In the case that n (integer) wireless circuits are used, it is desirable due to the same reason that at least one out of number of the plural blocks having the second data size and number of the plural blocks having the third data size is a n multiple.

In the case that the size of the packet data can be divided by a specific data size which is equal to or smaller than the fixed block size M and is equal to or larger than the minimum block size m, the packet data division unit 221 may divide the packet data into the blocks each of which has the specific data size. For example, in the case that the size X of the packet data is 1400 bytes, the packet data division unit 221 may divide the packet data so as to generate 7 blocks of 200 bytes. That is, the second data size and the third data size may be the same each other.

However, by setting the second data size to be the fixed block size M, and the third data size to be a value which is smaller than the fixed block size M and is equal to or larger than the minimum block size m, it is possible for the packet data division circuit 22 to carry out the division process with efficiency. The reason is that it is unnecessary for the packet data division circuit 22 to carry out the division process on the basis of the specific data size.

Furthermore, by showing an example, the division process mentioned above will be explained. In the case that the size X of the packet data is 300 bytes, the packet data division unit 221 divides the packet data to generate data whose data size is 256 bytes (corresponding to one block having the fixed block size M), and the residual data of 44 bytes. The residual data has a data size which is smaller than a residual data m. Accordingly, in this case, the packet data division unit 221 may divide the packet data into a block which has a data size of 200 bytes (second data size), and a block which has a data size of 100 bytes (third data size). Also by carrying out the above-mentioned process, it is possible to transmit the packet data since the packet data division unit 221 can divide the packet data into the blocks each of which has a value equal to or larger than the minimum block size m. Furthermore, the packet data division unit 221 may divide the packet data into a block which has a data size of 150 bytes (second data size), and a block which has a data size of 150 bytes (third data size).

In FIG. 7C, on the basis of data of 512 bytes (corresponding to 2 blocks each of which has the fixed block size M) and the residual data, the packet data division unit 221 may generate 1 block which includes the residual data, and 2 blocks each of whose sizes is equal to or smaller than the fixed block size M and is equal to or smaller than the minimum block size m (generate a total of 3 blocks). Also by carrying out the above-mentioned process, the packet data division unit 221 can generate blocks each of which has a data size equal to or larger than the minimum block size m. Similarly, by carrying out (n+1) division to data corresponding to n blocks (n is an integer) each having the fixed block size M, and the residual data, the packet data division unit 221 may generate (n+1) blocks each of whose data sizes is equal to or smaller than the fixed block size M and is equal to or larger than the minimum block size m. As far as blocks each of whose data sizes is equal to or smaller than the fixed block size M and is equal to or larger than the minimum block size m are generated, the packet data division unit 221 may divide data into (n+2) or more blocks. However, by generating a block, which includes the residual data, on the basis of only the residual data and data which is corresponding to one block having the fixed block size M, the packet data division unit 221 can generate a block, whose size is equal to or larger than the minimum block size m and which includes the residual data, in small number of processes.

Here, a size of data, which is used when dividing the residual data and the data into blocks, is changed according to a ratio of the minimum block size m to the fixed block size M. For example, a case that a value of the minimum block size m is two thirds of the fixed block size M will be considered. In this case, it is necessary to generate a total of 3 blocks, that is, 1 block which includes the residual data, and 2 blocks, each of whose data sizes is equal to or smaller than the fixed block size M and is equal to or larger than the minimum block size m, on the basis of data of 512 bytes (corresponding to 2 blocks each of which has the fixed block size M) and the residual data. The reason is that, in the case of using only the residual data and data of 256 bytes (corresponding to one block which has the fixed block size M), it is impossible for the packet data division unit 221 to generate blocks each of whose data sizes is equal to or larger than the minimum block size m.

It is possible to make the data transmission apparatus (or, data division apparatus) carry out the process flows shown in the exemplary embodiments 1 to 4 as one of control methods. For example, the data transmission apparatus (or, data division apparatus) may be instructed to carry out the flow as a control program Here, the control program, which is executed by the data transmission apparatus (or, data division apparatus), is stored by use of various types of non-transitory computer readable medium, and can be provided to a computer. The non-transitory computer readable medium includes various types of tangible storage medium. An example of the non-transitory computer readable medium includes a magnetic record medium (for example, flexible disk, magnetic tape, hard disk drive), a magnetic optical record medium (for example, magnetic optical disk), CD-ROM, CD-R, CD-R/W, a semiconductor memory (for example, mask ROM, PROM (Programmable ROM), EPROM (Erasable PROM), a flash ROM, RAM (Random Access memory). Moreover, a display control program may be provided to a computer by use of the various types of non-transitory computer readable medium. An example of the transitory computer readable medium includes an electric signal, an optical signal and an electromagnetic wave. The transitory computer readable medium can provide a computer with the control program via a wired communication line, such as a wire, an optical fiber or the like, or a wireless communication line.

Hereinafter, various embodiments will be added.

(Supplementary Note 1)

A data transmission apparatus which divides transmission data into blocks each of which has a predetermined data size, and transmits the blocks to a transmission destination apparatus, comprising:

a transmission data division unit which divides the transmission data into the blocks;

a transmission unit which transmits the blocks divided by the transmission data division unit to the transmission destination apparatus;

a calculation unit which calculates a size of residual data generated by dividing the transmission data into the blocks each having the predetermined data size; and a residual data judgment unit which judges whether the size of the residual data calculated by the calculation unit is smaller or not smaller than a minimum data size which the transmission destination apparatus can receive, wherein in the case that the residual data judgment unit judges that the size of the residual data is smaller than the minimum data size, the transmission data division unit generates a block, which includes the residual data and whose data size is equal to or larger than the minimum data size, by dividing the transmission data so as to make the block, which includes the residual data, include a part of the transmission data other than the residual data.

(Supplementary Note 2)

The data transmission apparatus according to supplementary note 1, wherein the transmission data division unit divides the transmission data into one or more blocks each of which has the predetermined data size, a block which includes the residual data, and a block having a first data size which is equal to or smaller than the predetermined data size and is equal to or larger than the minimum data size.

(Supplementary Note 3)

The data transmission apparatus according to supplementary note 2, wherein the block including the residual data has a data size almost equal to the first data size.

(Supplementary Note 4)

The data transmission apparatus according to supplementary note 1, wherein the transmission data division unit divides the transmission data into one or more blocks each of which has a second data size equal to or smaller than the predetermined data size and equal to or larger than the minimum data size, and one or more blocks each of which has a third data size equal to or smaller than the predetermined data size and equal to or larger than the minimum data size.

(Supplementary note 5)

The data transmission apparatus according to supplementary note 4, wherein the second data size is the predetermined data size and is different from the third data size.

(Supplementary Note 6)

The data transmission apparatus according to any one of supplementary notes 1 to 5, wherein the part of the transmission data, which are included in the block including the residual data and which are different from the residual data, are data which just follow or just precede the residual data in the transmission data.

(Supplementary Note 7)

The data transmission apparatus according to any one of supplementary notes 1 to 6, wherein in the case that the residual data judgment unit judges that the size of the residual data is equal to or larger than the minimum data size, the transmission data are divided into a block which includes the residual data, and a block which has the predetermined data size.

(Supplementary Note 8)

The data transmission apparatus according to any one of supplementary notes 1 to 7, wherein in the case that the size of the residual data, which is calculated by the calculation unit, is 0, the transmission data division unit divides the transmission data into a plurality of blocks each of which has the predetermined data size.

(Supplementary Note 9)

A data division apparatus which divides transmission data into blocks each of which has a predetermined data size, comprising:

a transmission data division unit which divides the transmission data into the blocks;

a calculation unit which calculates a size of residual data generated by dividing the transmission data into the blocks each having the predetermined data size; and a residual data judgment unit which judges whether the size of the residual data calculated by the calculation unit is smaller or not smaller than a minimum data size which a transmission destination apparatus can receive, wherein in the case that the residual data judgment unit judges that the size of the residual data is smaller than the minimum data size, the transmission data division unit generates a block, which includes the residual data and whose data size is equal to or larger than the minimum data size, by dividing the transmission data so as to make the block, which includes the residual data, include a part of the transmission data other than the residual data.

(Supplementary Note 10)

A data division method used by a data division apparatus which divides transmission data into blocks each of which has a predetermined data size, comprising:

calculating a size of residual data generated by dividing the transmission data into the blocks each having the predetermined data size;

judging whether the calculated size of the residual data is smaller or not smaller than a minimum data size which a transmission destination apparatus can receive; and generating a block, which includes the residual data and whose data size is equal to or larger than the minimum data size, by dividing the transmission data so as to make the block, which includes the residual data, include a part of the transmission data other than the residual data, in the case that it is judged that the size of the residual data is smaller than the minimum data size.

(Supplementary Note 11)

The data transmission apparatus according to supplementary note 2 or 3, wherein the transmission data division unit generates one or more blocks each of which has the predetermined data size before generating the block including the residual data, and the block which has the third data size, and wherein the transmission unit transmits the blocks, which the transmission data division unit generates, in turn.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application Publication No. 2012-164736, filed on Jul. 25, 2012, the disclosure of which is incorporated herein in its entirety by reference.

INDUSTRIAL APPLICABILITY

The present invention is applicable to a technical field of data transmission. For example, the present invention is applicable to packet data transmission including wireless packet data transmission.

REFERENCE SIGNS LIST 1 transmission data generation apparatus
2 receiving apparatus
3 and 4 L2SW apparatus
10 data transmission apparatus
11 transmission data division unit
12 transmission unit
13 calculation unit
14 residual data judgment unit
20 wireless packet transmission apparatus
21 transmission packet data buffer circuit
22 packet data division circuit
221 packet data division unit
222 calculation unit
223 residual data judgment unit
23 and 24 wireless sending circuit
25 and 26 wireless receiving circuit
27 and 28 received block data buffer circuit
29 packet data restoration circuit
30 wireless packet transmission apparatus
31 and 32 wireless receiving circuit
33 and 34 received block data buffer circuit
35 packet data restoration circuit
40 wireless packet transmission apparatus
41 sending and receiving control circuit
42 wireless sending circuit
43 wireless receiving circuit
44 transmission block data buffer circuit
45 packet data division circuit
46 received block data buffer circuit
47 packet data restoration circuit
50 wireless packet transmission apparatus
51 transmission and received data buffer circuit
52 wireless sending circuit
53 wireless receiving circuit
54 transmission packet data buffer circuit
55 received block data buffer circuit
60 wireless packet transmission apparatus
61 wireless receiving circuit
62 wireless sending circuit
63 sending and receiving control circuit
70 wireless packet transmission apparatus
71 wireless receiving circuit
72 wireless sending circuit
73 transmission and received data buffer circuit
80 packet transmission apparatus
81 transmission packet data buffer circuit
82 packet data division circuit
90 packet transmission apparatus
91 and 92 received block data buffer circuit
93 packet data restoration circuit

The invention claimed is:

1. A data transmission apparatus which divides transmission data into blocks each of which has a predetermined data size, and transmits the blocks to a transmission destination apparatus, comprising:

a transmission data division unit which divides the transmission data into the blocks;

a transmission unit which transmits the blocks divided by the transmission data division unit to the transmission destination apparatus;

a calculation unit which calculates a size of residual data generated by dividing the transmission data into the blocks each having the predetermined data size; and a residual data judgment unit which judges whether the size of the residual data calculated by the calculation unit is smaller or not smaller than a minimum data size which the transmission destination apparatus can receive, wherein in the case that the residual data judgment unit judges that the size of the residual data is smaller than the minimum data size, the transmission data division unit generates a block, which includes the residual data and whose data size is equal to or larger than the minimum data size, by dividing the transmission data so as to make the block, which includes the residual data, include a part of the transmission data other than the residual data.

2. The data transmission apparatus according to claim 1, wherein
the transmission data division unit divides the transmission data into one or more blocks each of which has the predetermined data size, a block which includes the residual data, and a block having a first data size which is equal to or smaller than the predetermined data size and is equal to or larger than the minimum data size.

3. The data transmission apparatus according to claim 2, wherein
the block including the residual data has a data size almost equal to the first data size.

4. The data transmission apparatus according to claim 1, wherein
the transmission data division unit divides the transmission data into one or more blocks each of which has a second data size equal to or smaller than the predetermined data size and equal to or larger than the minimum data size, and one or more blocks each of which has a third data size equal to or smaller than the predetermined data size and equal to or larger than the minimum data size.

5. The data transmission apparatus according to claim 4, wherein
the second data size is the predetermined data size and is different from the third data size.

6. The data transmission apparatus according to claim 4, wherein
the transmission data division unit generates one or more blocks each of which has the predetermined data size before generating the block including the residual data, and the block which has the third data size, and wherein
the transmission unit transmits the blocks, which the transmission data division unit generates, in turn.

7. The data transmission apparatus according to claim 1, wherein
the part of the transmission data, which are included in the block including the residual data and which are different from the residual data, are data which just follow or just precede the residual data in the transmission data.

8. The data transmission apparatus according to claim 1, wherein
in the case that the residual data judgment unit judges that the size of the residual data is equal to or larger than the minimum data size, the transmission data are divided into a block which includes the residual data, and a block which has the predetermined data size.

9. The data transmission apparatus according to claim 1, wherein
in the case that the size of the residual data, which is calculated by the calculation unit, is 0, the transmission data division unit divides the transmission data into a plurality of blocks each of which has the predetermined data size.

10. A data division apparatus which divides transmission data into blocks, comprising:
a transmission data division unit which divides the transmission data into the blocks;
a calculation unit which calculates a size of residual data generated by dividing the transmission data into the blocks each having the predetermined data size; and
a residual data judgment unit which judges whether the size of the residual data calculated by the calculation unit is smaller or not smaller than a minimum data size which a transmission destination apparatus can receive, wherein
in the case that the residual data judgment unit judges that the size of the residual data is smaller than the minimum data size, the transmission data division unit generates a block, which includes the residual data and whose data size is equal to or larger than the minimum data size, by dividing the transmission data so as to make the block, which includes the residual data, include a part of the transmission data other than the residual data.

11. A data division method used by a data division apparatus which divides transmission data into blocks each of which has a predetermined data size, comprising:
calculating a size of residual data generated by dividing the transmission data into the blocks each having the predetermined data size;
judging whether the calculated size of the residual data is smaller or not smaller than a minimum data size which a transmission destination apparatus can receive; and
generating a block, which includes the residual data and whose data size is equal to or larger than the minimum data size, by dividing the transmission data so as to make the block, which includes the residual data, include a part of the transmission data other than the residual data, in the case that it is judged that the size of the residual data is smaller than the minimum data size.

* * * * *